United States Patent
Nishimori et al.

(10) Patent No.: US 12,352,906 B2
(45) Date of Patent: Jul. 8, 2025

(54) TARGET OBJECT DETECTING DEVICE AND TARGET OBJECT DETECTING METHOD

(71) Applicant: Furuno Electric Co., Ltd., Hyogo (JP)

(72) Inventors: Yasushi Nishimori, Nishinomiya (JP); Nobuo Shibata, Nishinomiya (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 0 days.

(21) Appl. No.: 18/206,090

(22) Filed: Jun. 6, 2023

(65) Prior Publication Data

US 2023/0314583 A1    Oct. 5, 2023

Related U.S. Application Data

(63) Continuation-in-part of application No. PCT/JP2021/042613, filed on Nov. 19, 2021.

(30) Foreign Application Priority Data

Dec. 23, 2020    (JP) ................................. 2020-214334

(51) Int. Cl.
  *G08G 1/096*    (2006.01)
  *G01S 7/534*    (2006.01)
  (Continued)

(52) U.S. Cl.
  CPC .............. *G01S 7/534* (2013.01); *G01S 15/04* (2013.01); *G01S 15/96* (2013.01)

(58) Field of Classification Search
  USPC ......... 340/929, 539.22, 588, 636.12, 636.11, 340/662, 664, 683, 691.1, 825.23, 7.38
  See application file for complete search history.

(56) References Cited

U.S. PATENT DOCUMENTS 3,916,407 A    10/1975    Bosc et al.
4,209,843 A    6/1980    Hyatt
(Continued)

FOREIGN PATENT DOCUMENTS

EP    2846169 A1    3/2015
EP    3026458 A1    6/2016
(Continued)

OTHER PUBLICATIONS

Extended European search report issued on Nov. 5, 2024, in corresponding European patent Application No. 21910085.6, 11 pages.
(Continued)

*Primary Examiner* — Daniel Previl
(74) *Attorney, Agent, or Firm* — XSENSUS LLP

(57) ABSTRACT

A target object detecting device including first and second transmission signal generators, a wave transmitting array, first and second switches, and a controller is disclosed. The first and second transmission signal generators generate first and second transmission signals, respectively. The wave transmitting array has a plurality of wave transmitting elements which convert the first and second transmission signals into transmission waves. The first switch supplies the first transmission signal to one of the wave transmitting elements. The second switch supplies the second transmission signal to one of the wave transmitting elements. The controller performs a control in which the first switch switches the wave transmitting element to which the first transmission signal is supplied, from an element n to an element n+1, and the second switch switches the wave transmitting element to which the second transmission signal is supplied, from an element m to an element m+1.

20 Claims, 22 Drawing Sheets

(51) Int. Cl.
  *G01S 15/04* (2006.01)
  *G01S 15/96* (2006.01)

(56) References Cited

U.S. PATENT DOCUMENTS

| | | | | |
|---|---|---|---|---|
| 4,403,314 | A | * | 9/1983 | Tournois ............... G01S 7/5209 |
| | | | | 367/101 |
| 5,327,396 | A | | 7/1994 | Yasushi |
| 5,542,118 | A | * | 7/1996 | Warnagiris ............ G01S 13/753 |
| | | | | 340/870.37 |
| 6,778,468 | B1 | | 8/2004 | Nishimori et al. |
| 7,355,924 | B2 | | 4/2008 | Zimmerman et al. |
| 9,952,311 | B2 | | 4/2018 | Kojima |
| 10,281,575 | B2 | | 5/2019 | Rajendran et al. |
| 10,422,856 | B2 | | 9/2019 | Cheung et al. |
| 2009/0251361 | A1 | * | 10/2009 | Beasley ................ G01S 7/4056 |
| | | | | 342/194 |
| 2011/0140952 | A1 | | 6/2011 | Kemkemian et al. |
| 2015/0099977 | A1 | | 4/2015 | Kim et al. |
| 2017/0139044 | A1 | | 5/2017 | Laster |
| 2017/0315220 | A1 | | 11/2017 | Kozuki |
| 2017/0315229 | A1 | | 11/2017 | Pavek et al. |
| 2019/0053321 | A1 | * | 2/2019 | Islam ................... H04W 72/542 |
| 2019/0059064 | A1 | * | 2/2019 | Ghosh ................ H04W 56/0005 |
| 2019/0195984 | A1 | * | 6/2019 | Goda .................... G01S 13/931 |
| 2020/0166623 | A1 | | 5/2020 | Sahin et al. |
| 2020/0366360 | A1 | * | 11/2020 | Kotecha ............... H04J 11/0076 |
| 2022/0113393 | A1 | | 4/2022 | Nishimori et al. |
| 2022/0387851 | A1 | | 12/2022 | Tuxen et al. |

FOREIGN PATENT DOCUMENTS

| | | |
|---|---|---|
| EP | 4009069 A1 | 6/2022 |
| JP | 856-151370 A | 11/1981 |
| JP | H07-218619 A | 8/1995 |
| JP | 2003004901 A | 1/2003 |
| JP | 2003-315447 A | 11/2003 |
| JP | 2003-337171 A | 11/2003 |
| JP | 2019-113379 A | 7/2019 |
| WO | 92/02830 A1 | 2/1992 |
| WO | 99/34234 A1 | 7/1999 |
| WO | 2016/120745 A1 | 8/2016 |
| WO | 2020103409 A1 | 5/2020 |
| WO | 2021/019858 A1 | 2/2021 |

OTHER PUBLICATIONS

International Search Report and Written Opinion mailed on Jul. 21, 2020, received for PCT Application PCT/JP2020/018145, Filed on Apr. 28, 2020, 9 pages including English Translation.

Chilean Office Action issued May 30, 2023 in corresponding Chilean Patent Application No. 2021-002928 (machine-generated English translation only), 17 pages.

Extended European search report issued on Jul. 6, 2023, in corresponding European patent Application No. 20845907.3, 18 pages.

International Search Report and Written Opinion mailed on Feb. 1, 2022, received for PCT Application No. PCT/JP2021/042613, filed on Nov. 19, 2021, 9 pages including English Translation.

The First Office Action mailed Dec. 26, 2024, in Chinese Application No. 202080051647.0, 32 pages including English translation.

Non-Final Rejection mailed Aug. 12, 2024, in U.S. Appl. No. 17/557,067, 117 pages.

\* cited by examiner

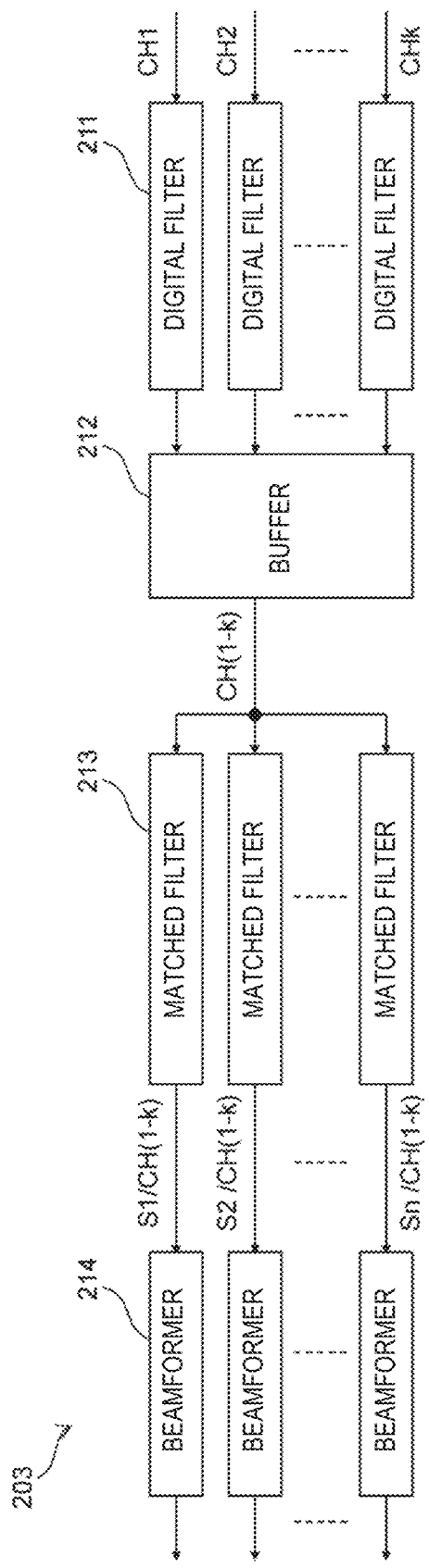
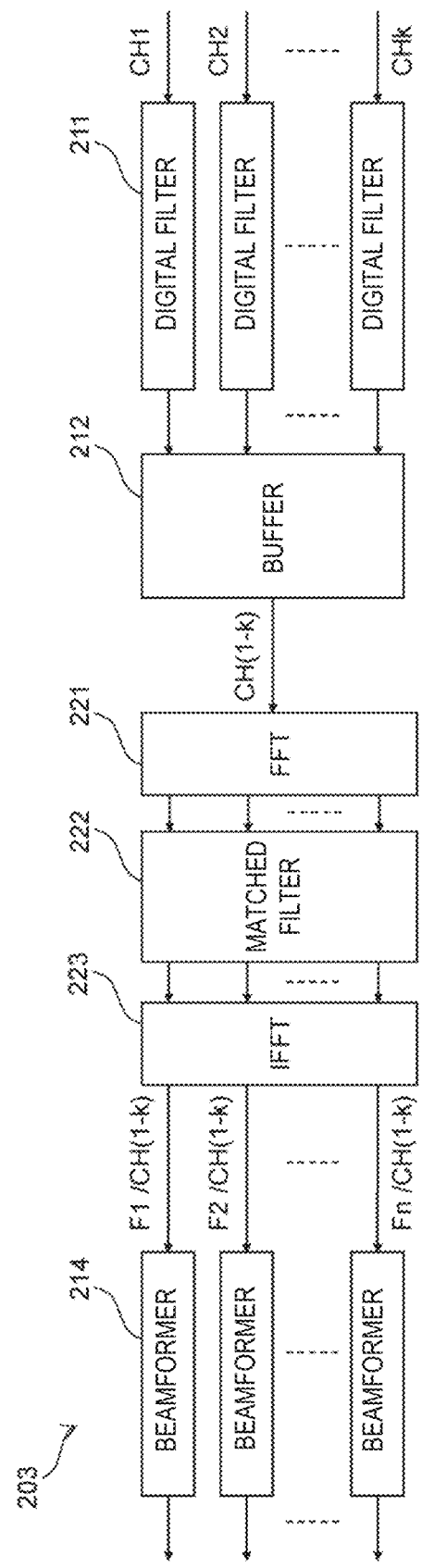
FIG. 11A
FIG. 11B

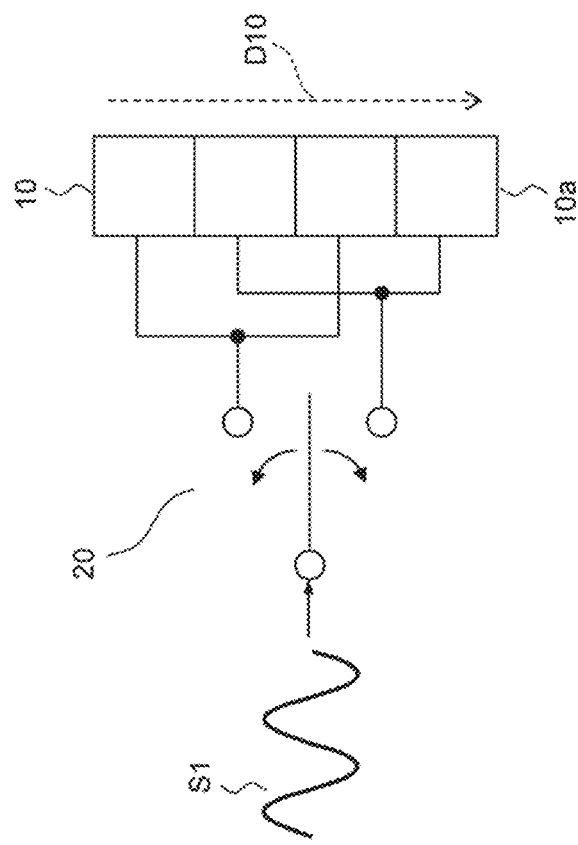
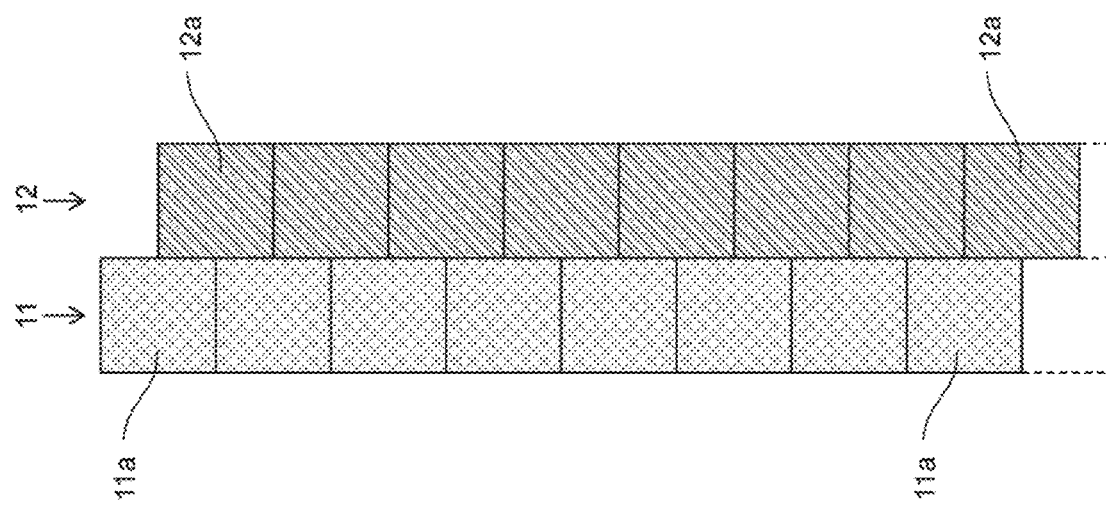
FIG. 22B
FIG. 22A

TARGET OBJECT DETECTING DEVICE AND TARGET OBJECT DETECTING METHOD

CROSS-REFERENCE TO RELATED APPLICATION(S)

This application is a continuation-in-part application of PCT International Application No. PCT/JP2021/042613, which was filed on Nov. 19, 2021, and which claims priority to Japanese Patent Application No. JP2020-214334, filed on Dec. 23, 2020, the entire disclosures of each of which are herein incorporated by reference for all purposes.

TECHNICAL FIELD

The present disclosure relates to a target object detecting device and a target object detecting method which transmit a transmission wave and detect a target object based on a reflection wave thereof.

BACKGROUND

Conventionally, a target object detecting device which transmits a transmission wave and detects a target object based on a reflection wave thereof is known. According to this kind of target object detecting device, the target object is detected, for example, by using a wave transmitting/receiving array (echo sounder transducer array) in which transducer elements are arrayed two-dimensionally. For example, a transmission wave is transmitted using one element at the center of the transducer array, and a reflection wave is received using all the elements of the transducer array. Upon the reception, a reception beam is formed in various directions by a phase control of all the elements, and the reception signal is generated for each direction. By processing the reception signal of each direction, the target object is detected per direction.

U.S. Pat. No. 7,355,924B2 discloses this kind of target object detecting device.

According to the target object detecting device of the above configuration, since there are a large number of elements in the transducer array, and there are also a large number of transmitting channels and a large number of receiving channels, the configuration of the target object detecting device becomes complicated, and it is difficult to reduce the cost.

The present disclosure is made in view of this problem, and one purpose thereof is to provide a target object detecting device and a target object detecting method, capable of detecting a target object by a simple configuration.

SUMMARY

The first aspect of the present disclosure relates to a target object detecting device. The target object detecting device according to this aspect includes a first transmission signal generator, a second transmission signal generator, a first wave transmitting array, a first signal switch, a second signal switch, and a controller. The first transmission signal generator generates a first transmission signal. The second transmission signal generator generates a second transmission signal. The first wave transmitting array has a plurality of first wave transmitting elements which convert the first transmission signal and the second transmission signal into transmission waves. The first signal switch supplies the first transmission signal to one of the first wave transmitting elements in the first wave transmitting array. The second signal switch supplies the second transmission signal to one of the first wave transmitting elements in the first wave transmitting array. The controller performs a first control in which the first signal switch switches the first wave transmitting element to which the first transmission signal is supplied, from an element n to an element n+1, and the second signal switch switches the first wave transmitting element to which the second transmission signal is supplied, from an element m to an element m+1.

In the target object detecting device according to the first aspect, the first wave transmitting array may be provided with P first wave transmitting elements, from first wave transmitting element 1 to first wave transmitting element P, and when the element n+1 corresponds to the first wave transmitting element beyond the first wave transmitting element P, the first signal switch may switch the first wave transmitting element to which the first transmission signal is supplied, from the first wave transmitting element P to the first wave transmitting element 1, and when the element m+1 corresponds to the first wave transmitting element beyond the first wave transmitting element P, the second signal switch may switch the first wave transmitting element to which the second transmission signal is supplied, from the first wave transmitting element P to the first wave transmitting element 1.

The second aspect of the present disclosure relates to a target object detecting method. The target object detecting method of the second aspect includes performing a first sweep in which a plurality of lined up wave transmitting elements are swept by a first transmission signal, and starting a second sweep in which the plurality of wave transmitting elements are swept by a second transmission signal at a timing before the first sweep is finished.

As described above, according to the present disclosure, the target object detecting device and the target object detecting method capable of detecting a target object by the simple configuration are provided.

The effect and the significance of the present disclosure will be made clearer by the description of embodiments below. However, the embodiments described below are merely one illustration in implementing the present disclosure, and the present disclosure is not limited in any way to the description of the embodiments below.

BRIEF DESCRIPTION OF DRAWINGS

FIG. 11A is a functional block diagram illustrating one example of a configuration of a reception signal processor, according to one embodiment, and FIG. 11B is a functional block diagram illustrating another example of the configuration of the reception signal processor, according to one embodiment.

FIG. 22A is a view illustrating a configuration of a first wave transmitting array and a second wave transmitting array, according to another modification, and FIG. 22B is a view illustrating a configuration of a wave transmitting array and a signal switch, according to still another modification.

DETAILED DESCRIPTION

Hereinafter, embodiments of the present disclosure will be described with reference to the drawings.

Basic Configuration

First, a basic configuration of a wave transmitting-and-receiving system of a target object detecting device according to this embodiment is described.

Figure 1A:
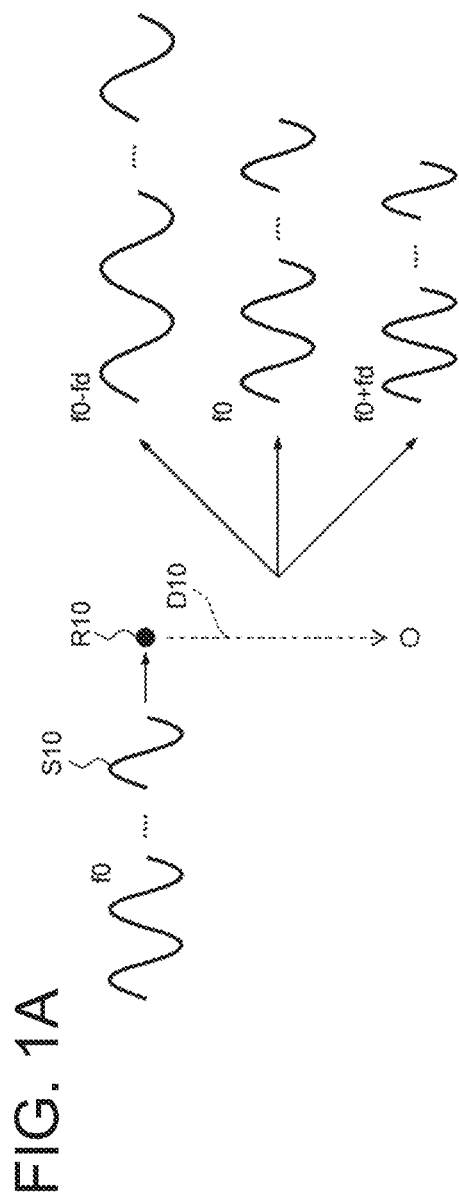
FIG. 1A is a view illustrating a configuration of a wave transmitting system, according to a reference example.

FIG. 1A is a view illustrating a configuration of a wave transmitting system according to a reference example.

According to the configuration of FIG. 1A, a transmission signal S10 is supplied to a wave transmission source R10, and a transmission wave is transmitted from the wave transmission source R10. For example, a carrier frequency of the transmission signal S10 is set to a constant value f0. In this state, when the wave transmission source R10 is moved in a moving direction D10, a change in the frequency based on the Doppler effect occurs in a transmission wave observed at an observation position which is distant from the wave transmission source R10 by a given distance. That is, when the distance between the wave transmission source R10 and the observation position is sufficiently large, the change in the frequency based on the Doppler effect does not arise at a front observation position located in the forward direction from an intermediate position in the moving range, but a transmission wave at the frequency f0 similar to the transmission signal S10 occurs.

On the other hand, at an upside observation position displaced in the opposite direction of the moving direction from the front observation position, since the wave transmission source R10 moves in a direction separating from the observation position, a transmission wave at a frequency f0-fd which is reduced in the frequency from the transmission signal S10 is caused by the Doppler effect. "-fd" is an amount of change in the frequency with respect to the frequency f0 of the transmission signal S10 by the Doppler effect. Further, at a downside observation position displaced in the direction same as the moving direction from the front observation position, since the wave transmission source R10 moves in a direction approaching the observation position, a transmission wave at a frequency f0+fd which is increased in the frequency from the transmission signal S10 is caused by the Doppler effect. "+fd" is an amount of change in the frequency with respect to the frequency f0 of the transmission signal S10 by the Doppler effect.

Such a change in the frequency becomes larger as the amounts of displacement at the upside observation position and the downside observation position with respect to the front observation position increase. That is, according to displacement angles in a depression angle direction (the same direction as the moving direction D10) and an elevation angle direction (the opposite direction from the moving direction D10) with respect to the front observation position, the frequency of the transmission wave changes in the positive direction and the negative direction from the frequency f0. Therefore, when the reflection wave of the transmission wave is received by the wave receiving element, the depression angle and the elevation angle can be calculated based on a frequency component of the reception signal outputted from the wave receiving element. In other words, by extracting a given frequency component from the reception signal, a reception signal at given angular positions in the depression angle direction and the elevation angle direction may be acquired. In this embodiment, based on this principle, the reception signal at each of the angular positions in the depression angle direction and the elevation angle direction may be acquired.

Figure 1B:
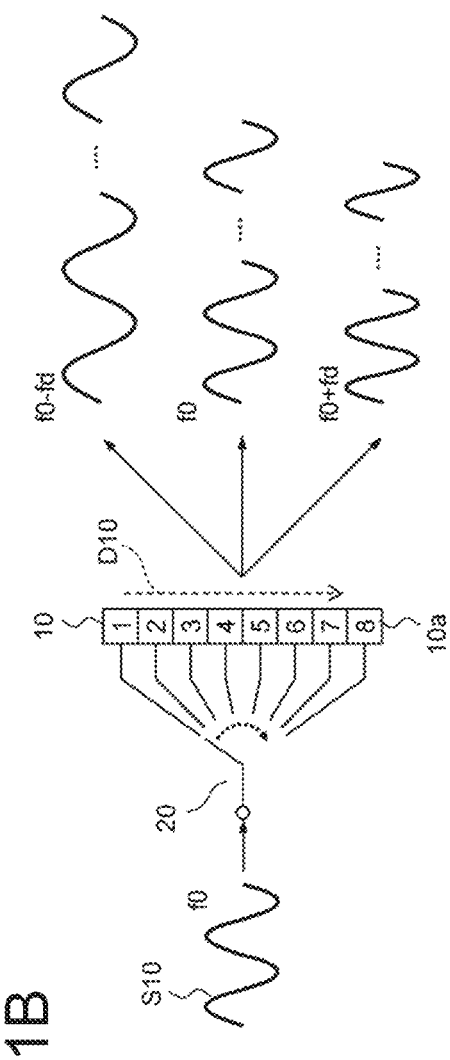
FIG. 1B is a view illustrating one example of a configuration for moving a wave transmission source according to one embodiment.

FIG. 1B is a view illustrating one example of a configuration for moving the wave transmission source R10.

In this example configuration, a wave transmitting array 10 in which a plurality of wave transmitting elements 10a are lined up in a single row is used. In FIG. 1B, for convenience, eight wave transmitting elements 10a are included in the wave transmitting array 10, but the number of wave transmitting elements 10a is not limited to eight. In FIG. 1B, for convenience, a number is given to each wave transmitting element 10a in order from the top.

In this example configuration, a connection of an input terminal of the transmission signal S10 to each wave transmitting element 10a may be switched by a signal switch 20. The signal switch 20 is comprised of a demultiplexer, for example. Here, the wave transmitting element 10a to which the transmission signal S10 is supplied may be switched to the next wave transmitting element 10a in order from the top. Thus, the wave transmission source of the transmission wave may move in the D10 direction. Also according to this example configuration, similarly to the case of FIG. 1A, the change in the frequency based on the Doppler effect occurs at each observation position.

In the example configuration of FIG. 1B, for example, when a wave transmission for one pulse is performed for one detection unit (1 ping) by sweeping only once the plurality of wave transmitting elements 10a disposed in the wave transmitting array 10 from the top to the bottom by using the transmission signal, each wave transmitting element 10a may transmit the wave only during a period in which this wave transmitting element 10a is driven. Therefore, according to this transmission method, the transmitting energy for one pulse may become lower, and the maximum detectable distance may be limited.

Thus, in this embodiment, by performing the sweep by sequentially driving the plurality of wave transmitting elements 10a of the wave transmitting array 10 in one direction for a plurality of times, the transmitting energy for one pulse may be increased. Therefore, the maximum detectable distance can be extended.

Figure 2:
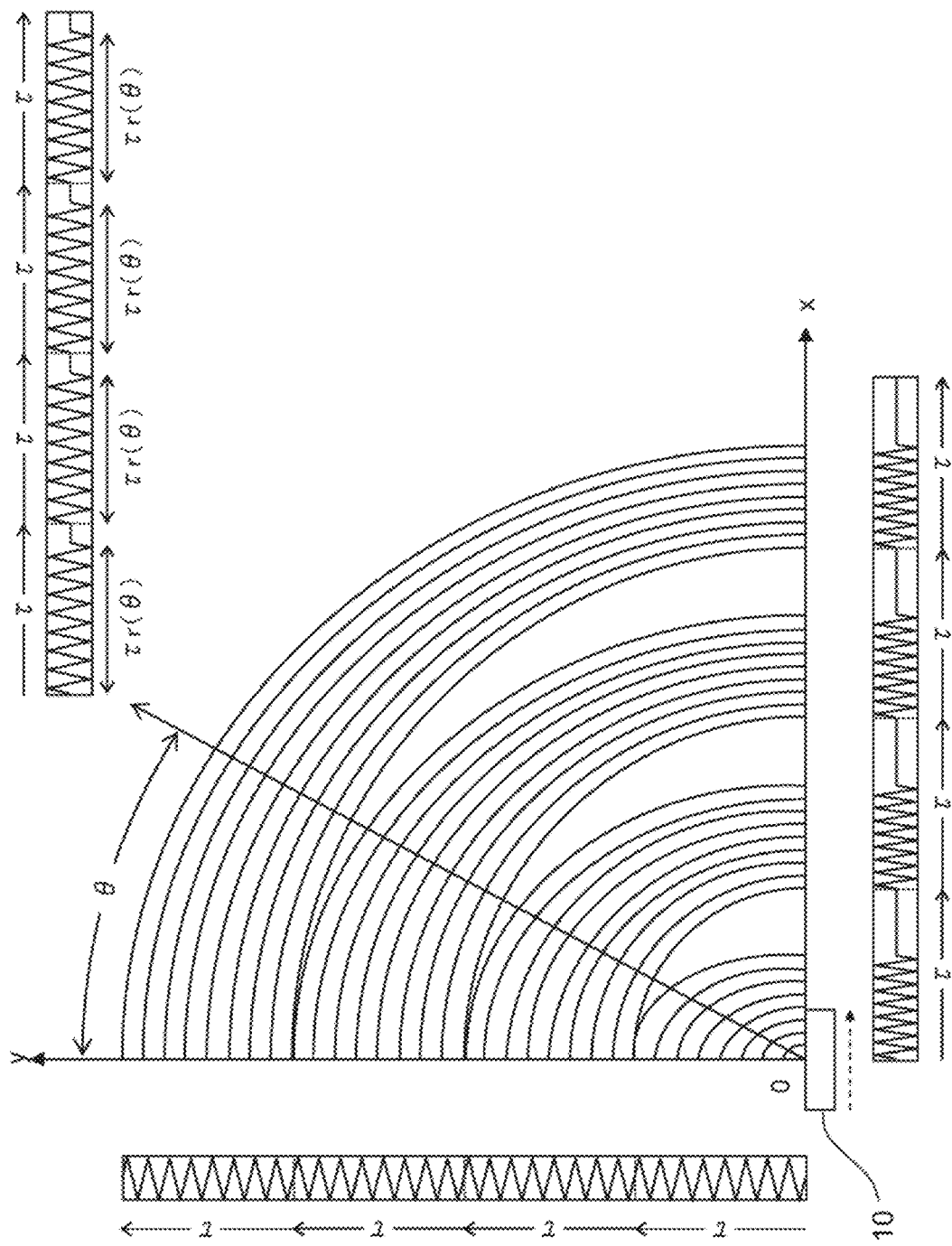
FIG. 2 is a view schematically illustrating a state of a sound field, when a wave transmitting array is swept a plurality of times, according to one embodiment.

FIG. 2 is a view schematically illustrating a state of a sound field, when the wave transmitting array 10 is swept a plurality of times.

In FIG. 2, the array direction of the wave transmitting elements 10a in the wave transmitting array 10 and the forward direction of the wave transmitting array 10 are set as x-axis and y-axis, respectively. Further, in FIG. 2, a wave surface of the sound field is illustrated.

A control for sweeping the wave transmitting array 10 by sequentially driving the plurality of wave transmitting elements 10a of the wave transmitting array 10 from one end (the wave transmitting element at a starting position) to the other end (the wave transmitting element at the ending position) and then repeating similar sweeps without any time gap may be performed. Therefore, after a sound source S moves from the starting position to the ending position, a state where the sound source S moves from the starting position to the ending position may be formed without any time gap. By repeating this control the given number of times in one detection unit, the transmission period of the pulse may be lengthened so that the transmitting energy increases. In FIG. 2, for convenience, a sound field in a case where the sweep is performed four times in one detection unit, is illustrated.

As illustrated in FIG. 2, a transmission packet by each sweep may be time-compressed according to a direction or bearing θ in the in-plane direction of the x-y plane on the basis of the forward direction (hereinafter, referred to as "the direction θ") so that the carrier frequency changes. Further, according to this time compression, a gap (a section of zero sound pressure) according to the direction θ may occur between the transmission packets. In FIG. 2, the transmission packets in the forward direction (y-axis direction) and the sweep direction (x-axis direction) of the wave transmitting array 10 are indicated along the y-axis and the x-axis, respectively, and the transmission packets in an arrow direction are indicated at the tip end of the arrow. "T" assigned to each transmission packet may be a period during which the sound source S moves from the starting position to the ending position (i.e., one sweep period of the wave transmitting array 10).

As illustrated in FIG. 2, in the forward direction (y-axis direction), since there is no Doppler effect, the waveform of the transmission packet is maintained at the same waveform as the transmission signal. Therefore, in the forward direction, the gap is not generated between the transmission packets. On the other hand, in the sweep direction (x-axis direction) of the wave transmitting array 10, the waveform of the transmission packet is greatly compressed by the Doppler effect so that a large gap is generated between the transmission packets. Further, in the arrow direction, since the Doppler effect is smaller than in the x-axis direction, the waveform compression of the transmission packet becomes smaller so that the gap which is generated between the transmission packets is reduced.

Thus, since the waveform compression and the gap state are different for each direction, the frequency spectrum of the sound wave differs for each direction. That is, in the direction in which the discontinuity of the phase is caused by the gap, the spectral intensity becomes lower, and in the direction in which the discontinuity of the phase is not caused by the gap, the spectral intensity becomes higher. In detail, in the direction in which the gap becomes an integral multiple of the wavelength, since the discontinuity of the phase is not caused, the spectral intensity becomes higher.

Here, the number of waves transmitted in the forward direction (θ=0) by one sweep is $f0·τ$, and this packet is repeated at the sweep period T to transmit in the forward direction a CW wave with a long pulse width and a continuous phase. On the other hand, in directions other than the forward direction, although the discontinuity of the phase is caused by the gap depending on the direction, the initial phase between the packets may be maintained in the carrier frequency direction in which the following relational expression is satisfied.

$$f0·τ+n=fn·τ(n=0,1,\ldots) \quad (1)$$

If the period of the gap (i.e., the period of the phase stop) is an integral multiple of a career cycle in this direction, the initial phase between the packets becomes the same, and the influence of the gap becomes minor. This condition may be expressed by the following formula using the above-described Formula (1).

$$fn = f0 + \frac{n}{\tau} \qquad (2)$$

Formula (2) shows that a direction of continuous phase (i.e., a direction where the spectrum is narrowed) is formed for every 1/τ.

Next, a beam spacing (an interval of the transmission beam formed) is considered.

The direction where the transmission beam is formed may be the direction where the initial phases are continuous as described above, and may be the direction where the carrier frequency satisfies Formula (2). This direction θn may be associated with other variables by the following formula.

The time of the gap in the θ direction can be obtained by the following formula.

$$\tau - \tau_\theta = \tau - \tau \cdot r(\theta) = \frac{\tau V \sin\theta}{c} \qquad (3)$$

Here, "V" is a moving speed of the sound source S, "c" is a speed of sound, and "r(θ)" is a compression ratio of the transmission wave which propagates in the θ direction.

Since the direction where the time of the gap becomes an integral multiple of the cycle of the carrier frequency in the θ direction is θn, θn may be defined by the following formula.

$$\frac{\tau V \sin\theta_n}{c} = n \cdot \frac{1}{f(\theta_n)} = n \frac{1}{f0} \cdot \frac{c - V \sin\theta_n}{c} \qquad (4)$$

Therefore, θn can be obtained by the following formula.

$$\theta_n = \sin^{-1}\left(\frac{n \cdot c}{f0 \cdot V} \cdot \frac{1}{\tau + \frac{n}{f0}}\right) \qquad (5)$$

Therefore, the transmission beam may be formed in the direction θn which can be obtained by the above-described Formula (5). Therefore, by extracting the carrier frequency in the direction θn, a reception signal for each transmission beam can be extracted.

Figure 3:
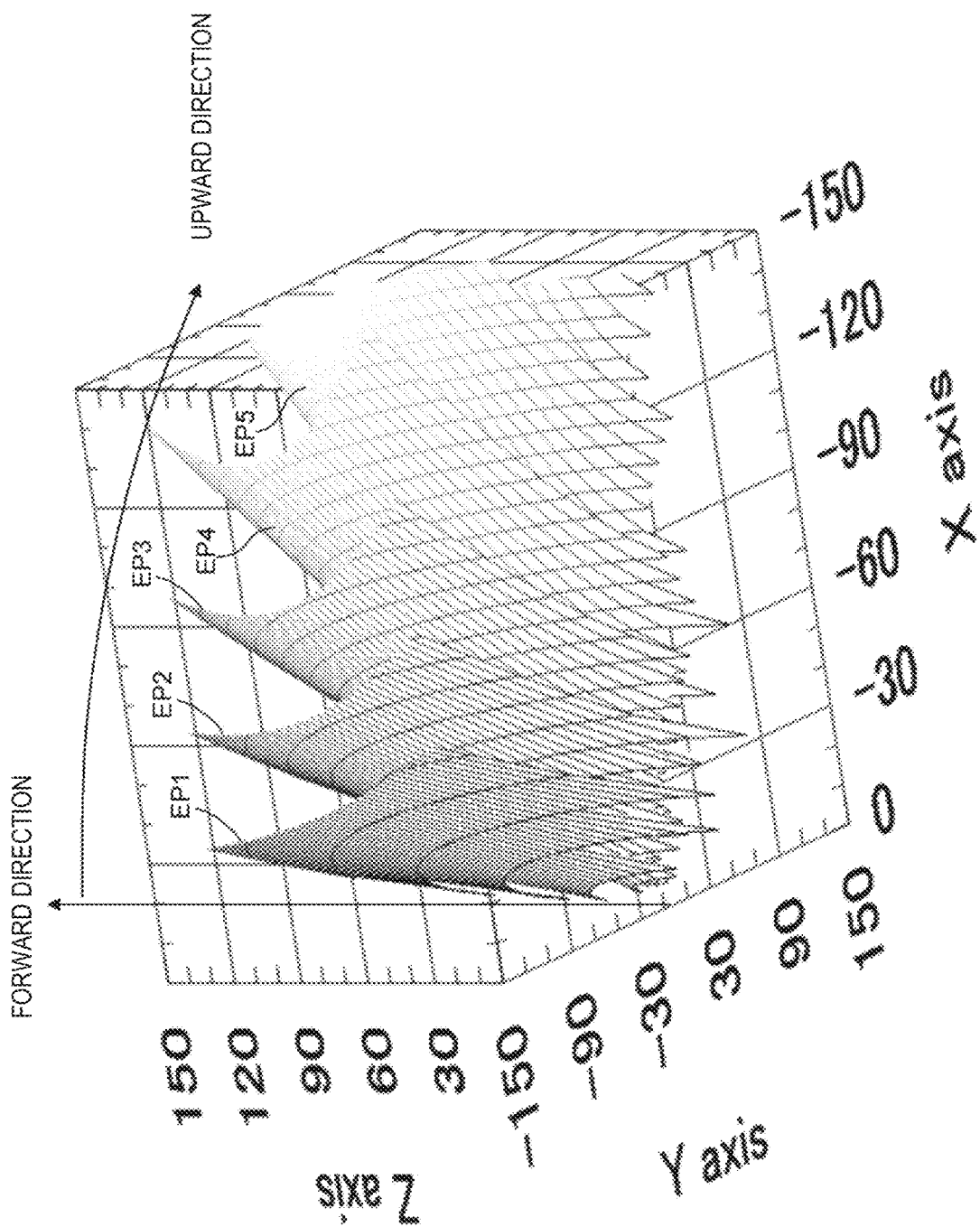
FIG. 3 is a view illustrating a simulation result in which an equifrequency surface is obtained by a simulation, according to one embodiment.

FIG. 3 is a view illustrating a simulation result when a surface where the amount of change in the frequency by the Doppler effect is the same (hereinafter, referred to as an "equifrequency surface") is obtained by a simulation, in the case where the sound source S is moved in one direction as described above.

In FIG. 3, the unit of each axis is meter. The wave transmitting array 10 is disposed at an intermediate position (the position where the distance is zero) in the Y-axis direction so that it extends in the X-axis direction. The transmission wave is transmitted in the Z-axis direction from the intermediate position in the Y-axis direction. That is, the direction along the Z-axis direction from the intermediate position in the Y-axis direction is the forward direction.

In FIG. 3, equifrequency surfaces EP1 to EP5 within a range above the forward direction are illustrated. The equifrequency surfaces EP1, EP2, EP3, EP4, and EP5 are surfaces of the frequencies f0-fd1, f0-fd2, f0-fd3, f0-fd4, and f0-fd5, respectively. "f0" is the frequency in the forward direction, which is equal to the frequency of the transmission signal supplied to the wave transmitting element. fd1 to fd5 have a relationship of fd1<fd2<fd3<fd4<fd5.

In FIG. 3, for convenience, five equifrequency surfaces EP1 to EP5 are illustrated, but a large number of equifrequency surfaces also exist between the equifrequency surfaces EP1 to EP5. For example, the frequency of the gap between the equifrequency surfaces EP1 and EP2 transits continuously from f0-fd1 to f0-fd2. By folding the equifrequency surfaces EP1 to EP5 in FIG. 3 symmetrically about to the Y-Z plane, equifrequency surfaces within a range below the forward direction are formed.

By using for target object detection the equifrequency surfaces corresponding to the transmission beam formed by the above-described Formula (5) among the equifrequency surfaces formed in this way, the accuracy of the target object detection can be raised.

Figure 4:
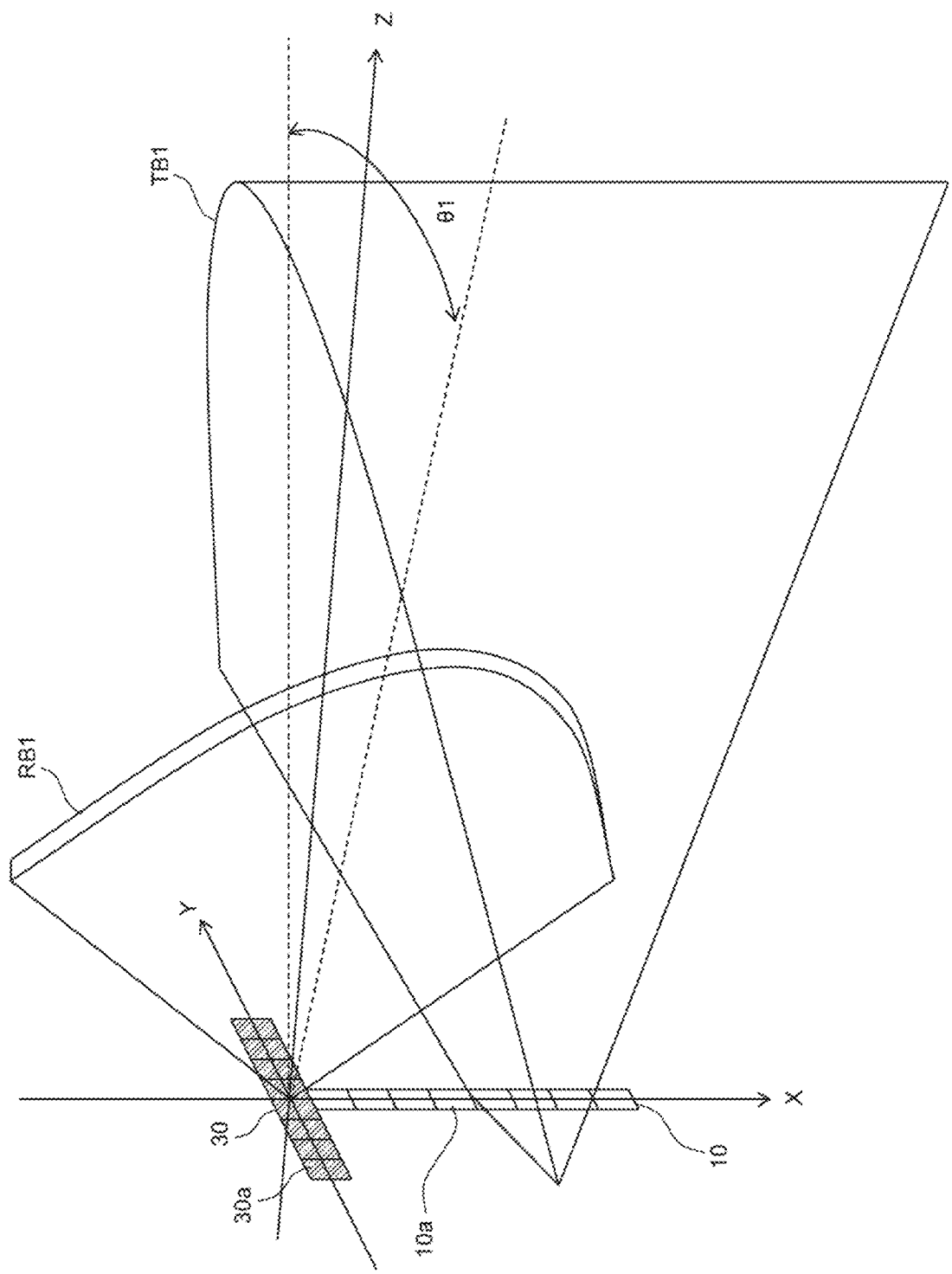
FIG. 4 is a view schematically illustrating one example of a configuration of a wave transmitting-and-receiving system, according to one embodiment.

FIG. 4 is a view schematically illustrating one example of a configuration of the wave transmitting-and-receiving system.

In this example configuration, in addition to the configuration of the wave transmitting array 10 (wave transmitting system) illustrated in FIG. 1(b), a wave receiving array 30 having a plurality of receiving elements 30a may be disposed as a configuration of a wave receiving system. The wave transmitting array 10 may be disposed so that the wave transmitting elements 10a are lined up along the X-axis. The wave receiving array 30 may be disposed at a position immediately above the wave transmitting array 10. In this example configuration, the array direction of the wave receiving elements 30a and the array direction of the wave transmitting elements 10a may be perpendicular to each other.

By sequentially driving the wave transmitting elements 10a in the wave transmitting array 10 in the up-down direction, a transmission beam TB1 may be formed forward of the wave transmitting array 10 (in the positive Z-axis direction).

That is, when the transmission signal S10 is supplied to the wave transmitting elements 10a, the transmission wave may be transmitted with a comparatively large directivity from the wave transmitting elements 10a. When the transmission signals S10 for one sweep are supplied to the wave transmitting elements 10a in the wave transmitting array 10 sequentially from the top, an area where all the transmission waves transmitted from the wave transmitting elements 10a overlap with each other may become an area where all the transmission beams TB1 are formed. In this formation area, a large number of equifrequency surfaces may be generated, as described with reference to FIG. 3.

By performing a phase control (beamforming) to the reception signals outputted from the wave receiving elements 30a, a narrow reception beam RB1 may be formed in the circumferential direction centering on the X-axis. Therefore, the reception signal in the area where the reception beam RB1 intersects with the transmission beam TB1 may be extracted. By rotating the reception beam RB1 in the θ1 direction centering on the X-axis by the above-described phase control, the reception signal at each rotated position may be extracted. Based on the rotated position of the reception beam RB1, a horizontal incoming direction of the reflection wave which is caused by the transmission wave being reflected on a target object may be defined. Further, based on the frequency of the reception signal, the equifrequency surface (see FIG. 3) where the reflection wave is generated may be defined.

Therefore, by extracting the reception signal of the frequency corresponding to each equifrequency surface among the reception signals extracted by the reception beam RB1, and plotting the intensity on each equifrequency surface of the extracted reception signal to the equifrequency surface, a distribution of intensity data of the reception signals in the area where the reception beam RB1 intersects with the transmission beam TB1 may be acquired. Then, by rotating the reception beam RB1 within a horizontal detection area, and acquiring the distribution of the intensity data at each rotated position, intensity data (volume data) which are distributed three-dimensionally within all the detection areas in the horizontal direction and the vertical direction can be acquired. By imaging the intensity data (volume data), an image indicative of a state of target object(s) within the detection area can be obtained.

Meanwhile, in the above configuration, a signal which is frequency-modulated, such as a chirp signal, may be used as the transmission signal. In this case, by applying a well-known pulse compression technique using a matched filter to the reception signal, a distance resolution of the target object detection can be raised.

Further, when repeating the sweeping of the wave transmitting array a plurality of times to generate the transmission pulse as described above, a window may be applied for each sweep in order to suppress side lobes which are caused in the sweep direction (bearing direction).

Figure 5:
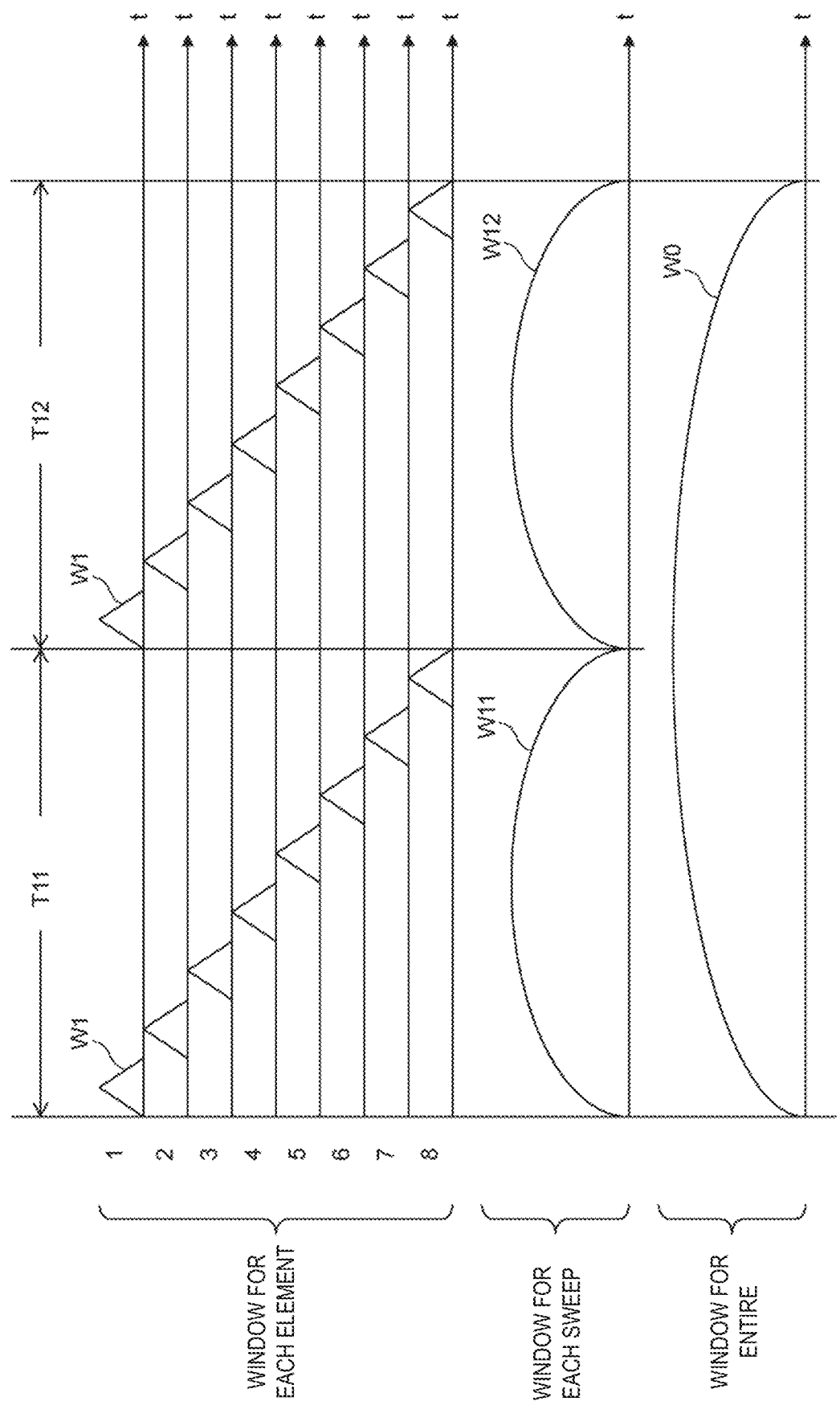
FIG. 5 is a view illustrating an example application of windows for suppressing side lobes, according to a comparative example.

FIG. 5 is a view illustrating an example application of the window for suppressing the side lobes.

In FIG. 5, an example application of windows when the wave transmitting array 10 is swept twice to generate the transmission pulse is illustrated. T11 may be a first sweep period, and T12 may be a second sweep period. Numbers 1 to 8 in the upper row of FIG. 5 indicate the numbers of the wave transmitting elements 10a as in FIG. 1B. A waveform illustrated beside each number schematically illustrates a waveform of a window W1 for every wave transmitting element 10a, which is applied during a period when the wave transmitting element 10a of each number is driven by the transmission signal. Waveforms in the middle row of FIG. 5 are waveforms of windows W11 and W12 which are set for each sweep, and a waveform in the lower row of FIG. 5 is a waveform of a window W0 applied to the entire transmission pulse.

The waveform of each window indicates weighting of the transmission signal. The weight may be higher as the waveform of the window is higher. The transmission signal may be amplified with a weight which is obtained by superimposing the weights of all the windows. That is, the transmission signal (for example, the chirp signal) which is frequency-modulated over a period from a start time of the sweep period T11 (a start timing of the transmission pulse) to an end time of the sweep period T12 (an end timing of the transmission pulse) may be amplified with the weight which is obtained by superimposing the weights of all the windows. Thus, the transmission signal amplified by each window may be supplied to each wave transmitting element 10a at the timing of switching of the signal switch 20.

By setting the windows to the transmission signal as illustrated in FIG. 5, the side lobes may be suppressed. The side lobes caused in the sweep direction may be suppressed by the window W1 in the upper row, and the windows W11 and W12 in the middle row, and the side lobes in the distance direction (time-axis direction) may be suppressed by the window W0 in the lower row.

However, if the windows are applied to the transmission signal in this way, when the reception processing is performed using the ideal matched filter for the transmission signal for each sweep direction (each equifrequency surface as described above), a ripple may occur in the transmission wave under the influence of the windows W11 and W12 for each sweep.

Figure 6A:
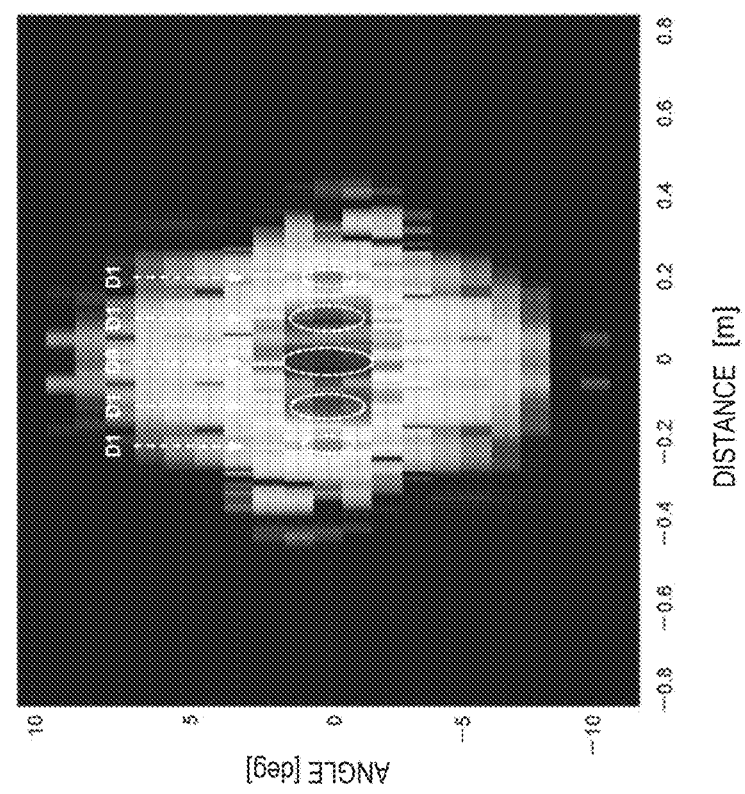
FIG. 6A is a view illustrating a simulation result of a waveform of a transmission wave, when the windows illustrated in FIG. 5 are applied.
Figure 6B:
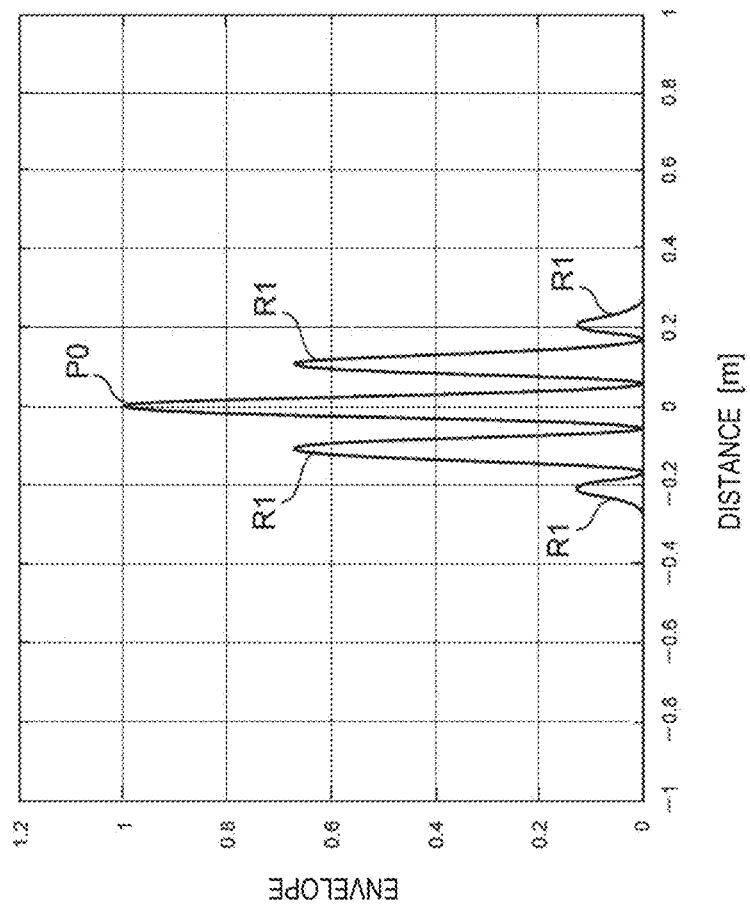
FIG. 6B is a view illustrating a simulation result when a reception processing result of carrying out reception processing of an echo of the transmission wave of FIG. 6A is obtained by a simulation.

FIG. 6A is a view illustrating a simulation result of the waveform of the transmission wave in the case where the windows are set as illustrated in FIG. 5, which is obtained by a simulation, and FIG. 6B is a view illustrating a result of reception processing of the echo of this transmission wave, which is obtained by a simulation. In FIG. 6B, it is assumed that the target object exists at a position of 0 degree in the sweep direction (a position in the forward direction). Further, in these simulations, it is assumed that the sweep is repeated five times to generate the transmission pulse of one detection unit.

In FIG. 6A, the horizontal axis is a distance in the front-rear direction from the center waveform P0, and the vertical axis is an intensity of the envelope of the transmission wave. Further, in FIG. 6B, the horizontal axis is a distance in the front-rear direction from a normal distance position of the target object, and the vertical axis is an angle of the sweep direction with respect to the forward direction. Note that the graph of FIG. 6A is standardized considering the peak of the center waveform P0 as 1. Further, although the original drawing of FIG. 6B was a color image, this color image is illustrated by a gray scale for convenience.

When the windows are set by the method of FIG. 5, a plurality of ripples R1 may occur before and after the center waveform P0, as illustrated in FIG. 6A. Therefore, as illustrated in FIG. 6B, in the reception processing result, the high-intensity area (broken-line elliptical area) may occur also at distance positions D1 corresponding to the ripples R1, in addition to the normal distance position D0 of the target object. In this case, in the detection image of the target object, an image indicative of the target object may be displayed also at the distance positions D1 corresponding to the ripples R1, in addition to the normal distance position D0 of the target object. Therefore, in the detection image, the position of the target object may not be clearly displayed, but it may become an indication in which a plurality of target object images are overlapped near the normal position of the target object.

In order to solve such a problem, in this embodiment, the next sweep may be initiated between the start and the end of one sweep. This prevents an occurrence of a deep valley at the boundary between the window W11 set to one sweep and the window W12 set to the next sweep, and it prevents the occurrence of the ripples R1 as illustrated in FIG. 6A.

Figure 7:
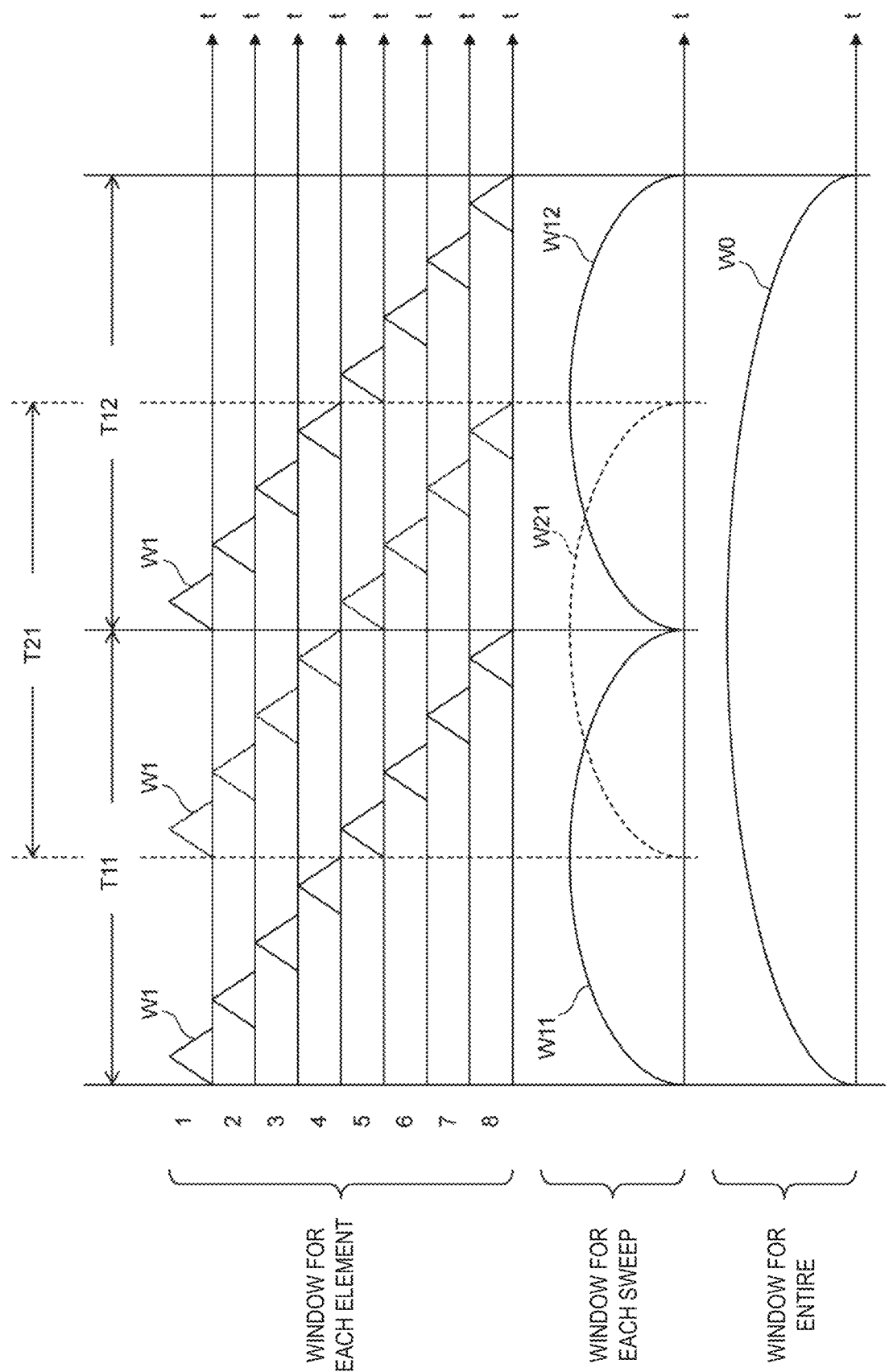
FIG. 7 is a view illustrating an example application of the windows, according to one embodiment.

FIG. 7 is a view illustrating an example application of the windows in this case.

In the example of FIG. 7, a sweep in a sweep period T21 is set between the sweep in the sweep period T11 and the sweep in the sweep period T12. The sweep in the sweep period T21 may be started at an intermediate timing of the sweep period T11. Further, the sweep in the next sweep period T12 may be started at an intermediate timing of the sweep period T21. A window W21 illustrated by a broken line in the middle row may also be set in the sweep period T21.

In the sweep period T21, the windows W1, W21, and W0 in the upper row, the middle row, and the lower row corresponding to the sweep period T21 may be applied. That is, the windows W1 in the upper row applied in the sweep period T21 may be eight windows lined up obliquely. Further, the window W21 in the middle row applied in the sweep period T21 may be a window similar to the windows W11 and W12, and the window W0 in the lower row applied in the sweep period T21 may be a part which is cut out from the window W0 in the lower row within the range of the sweep period T21. The windows applied in the sweep periods T11 and T12 may be similar to the case of FIG. 5.

Also in the case of FIG. 7, the transmission signal (for example, a chirp signal) which is frequency-modulated over a period from the start time of the sweep period T11 (the start timing of the transmission pulse) to the end time of the sweep period T12 (the end timing of the transmission pulse) may be amplified with the weight which is obtained by superimposing the weights of all the windows, for each of the sweep periods T11, T12, and T21. Thus, the transmission signal which is weighted in each window may be supplied to each wave transmitting element 10a during the drive period of each wave transmitting element 10a in each sweep period.

Also when the windows are set as illustrated in FIG. 7, the side lobes may be suppressed similarly to the case of FIG. 5. Also in this case, the side lobes caused in the sweep direction may be suppressed by the window W1 in the upper row and the windows W11, W12, and W21 in the middle row, and the side lobes in the distance direction may be suppressed by the window W0 in the lower row.

Further, according to the setting method of FIG. 7, since the window W21 in the middle row of the sweep period T21 is interpolated between the window W11 in the middle row of the sweep period T11 and the window W12 in the middle row of the sweep period T12, it suppresses the occurrence of the deep valley at the boundary between these windows. Thus, that prevents the occurrence of the ripples R1 as illustrated in FIG. 6B.

Figure 8A:
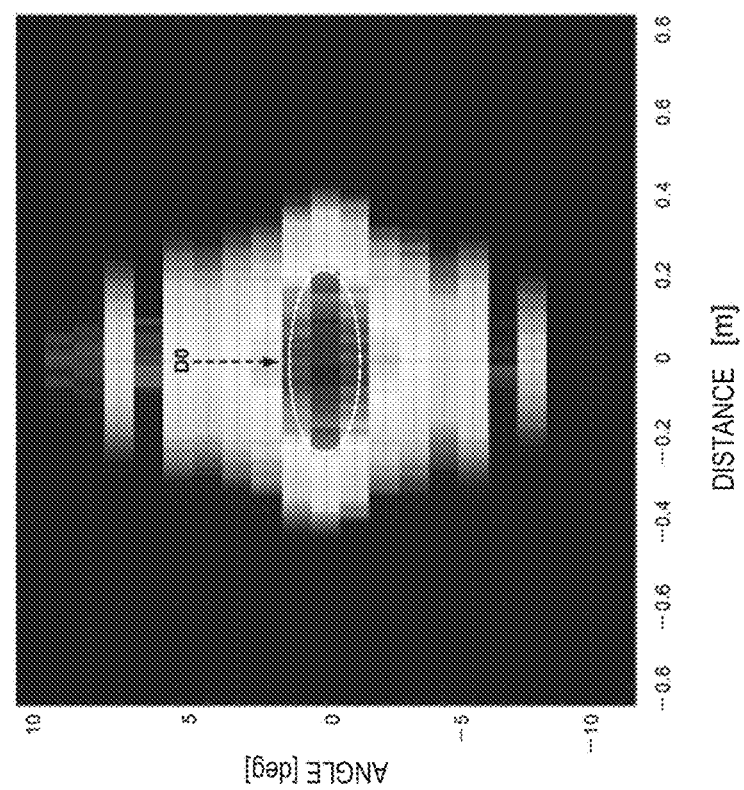
FIG. 8A is a view illustrating a simulation result of a waveform of the transmission wave, when the windows illustrated in FIG. 7 are applied.
Figure 8B:
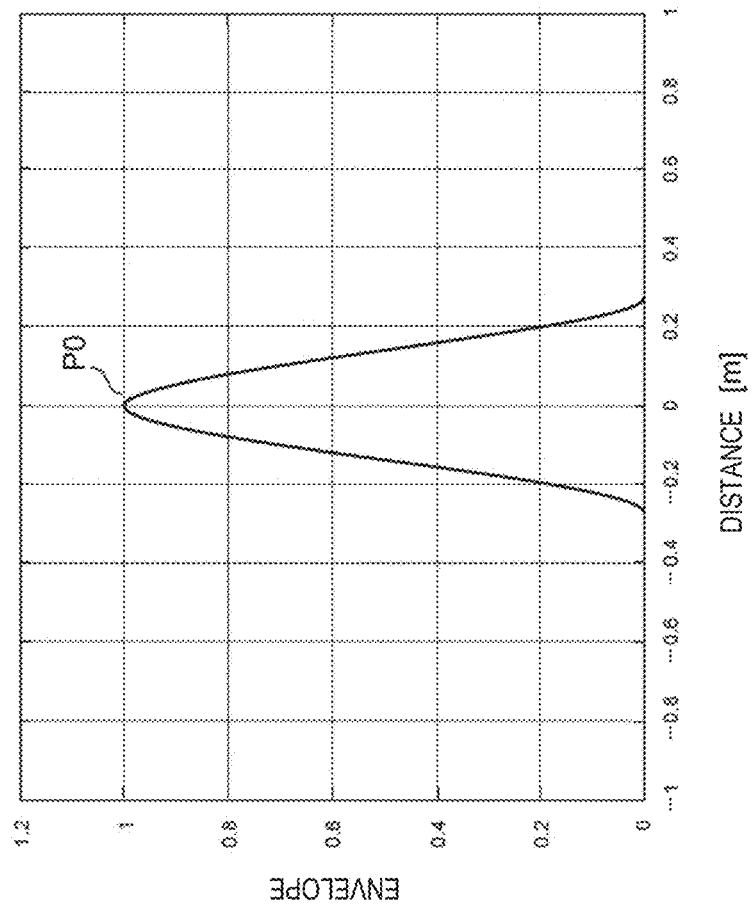
FIG. 8B is a view illustrating a simulation result when a reception processing result of carrying out reception processing of the echo of the transmission wave of FIG. 8A is obtained by a simulation.

FIGS. 8A and 8B are each views illustrating a simulation result when the windows are set as illustrated in FIG. 7.

FIG. 8A illustrates a simulation result of the transmission waveform similar to FIG. 6A, and FIG. 8B illustrates a simulation result of the reception processing result similar to FIG. 6B. Also in the simulation of FIG. 8B, it is assumed similarly to FIG. 6B that the target object exists at a position of 0 degree in the sweep direction (the position in the forward direction). Further, also in these simulations, it is assumed that the sweep is repeated five times to generate one transmission pulse.

As illustrated in FIG. 8A, when the windows are set by the method of FIG. 7, the ripple R1 does not occur like in FIG. 6A, but the transmission wave may have a waveform P0 with a single peak. Therefore, as illustrated in FIG. 8B, in the reception processing result, a high-intensity area (a broken line elliptical area) may occur near the normal distance position D0 of the target object, without the high-intensity areas which are clearly separated in the distance direction as illustrated in FIG. 6B. Therefore, in the detection image of the target object, it prevents that a plurality of target object images is displayed so as to overlap with each other near the normal distance position of the target object, and the image indicative of the target object is displayed near the normal distance. Therefore, in the detection image, the position of the target object can be displayed more clearly, and the accuracy of the image indicative of the target object can be raised.

Figure 9:
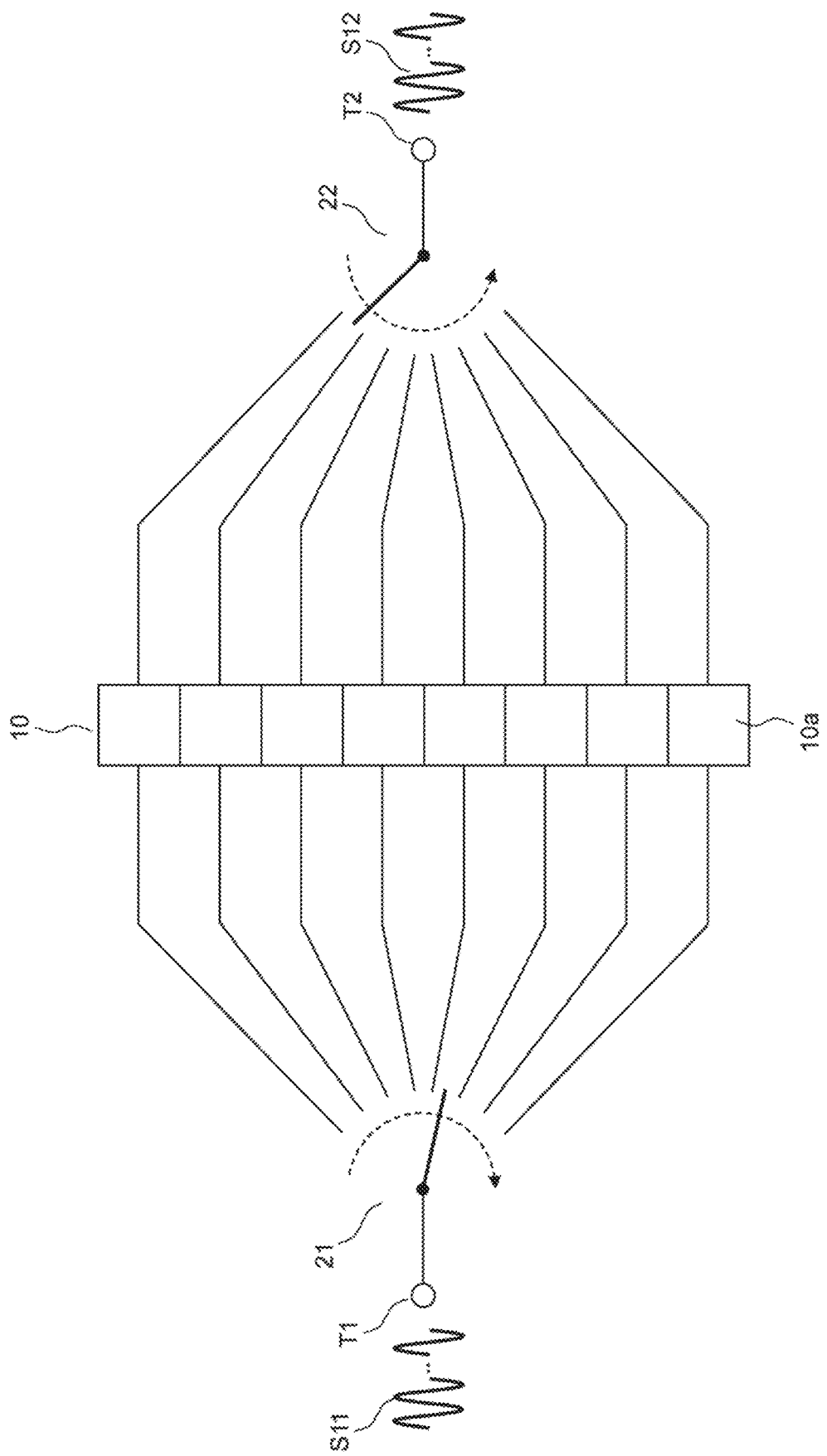
FIG. 9 is a view illustrating a configuration of a signal switch when starting the next sweep in the middle of one sweep, according to one embodiment.

FIG. 9 is a view illustrating a configuration of the signal switch, when starting the next sweep in the middle of one sweep, as illustrated in FIG. 7.

When starting the next sweep in the middle of one sweep, two signal switches comprised of the first signal switch 21 and the second signal switch 22 may be used, as illustrated in FIG. 9. The first signal switch 21 and the second signal switch 22 may be each comprised of a demultiplexer, for example. For example, the first signal switch 21 is used for odd-numbered sweeps, and the second signal switch 22 is used for even-numbered sweeps. In this case, a first transmission signal S11 may be supplied to a terminal T1, and a second transmission signal may be supplied to a terminal T2. Each transmission signal may be a signal which is obtained by weighting the transmission signal (for example, a chirp signal), which is frequency-modulated over the period from the start timing of the transmission pulse to the end timing of the transmission pulse by each window in FIG. 7, for example, for each sweep period, as described above.

For example, at a timing when the first signal switch 21 switches the supply destination of the first transmission signal S11 from the fourth wave transmitting element 10a from the top to the fifth wave transmitting element 10a from the top, the second signal switch 22 may connect the terminal T2 to the first wave transmitting element 10a from the top. Thus, as illustrated in FIG. 7, the sweep of the sweep period T21 may be started in the middle of the sweep period T11. Therefore, it prevents as described above that the ripples R1 occur in the transmission wave.

Note that, when overlapping the sweep periods by one half as illustrated in FIG. 7, the repeating period of the sweep may become half as compared with the case of FIG. 5. Therefore, the chirp bandwidth can be doubled, and the distance resolution of the target object detection can be raised.

<Concrete Configuration>

Figure 10:
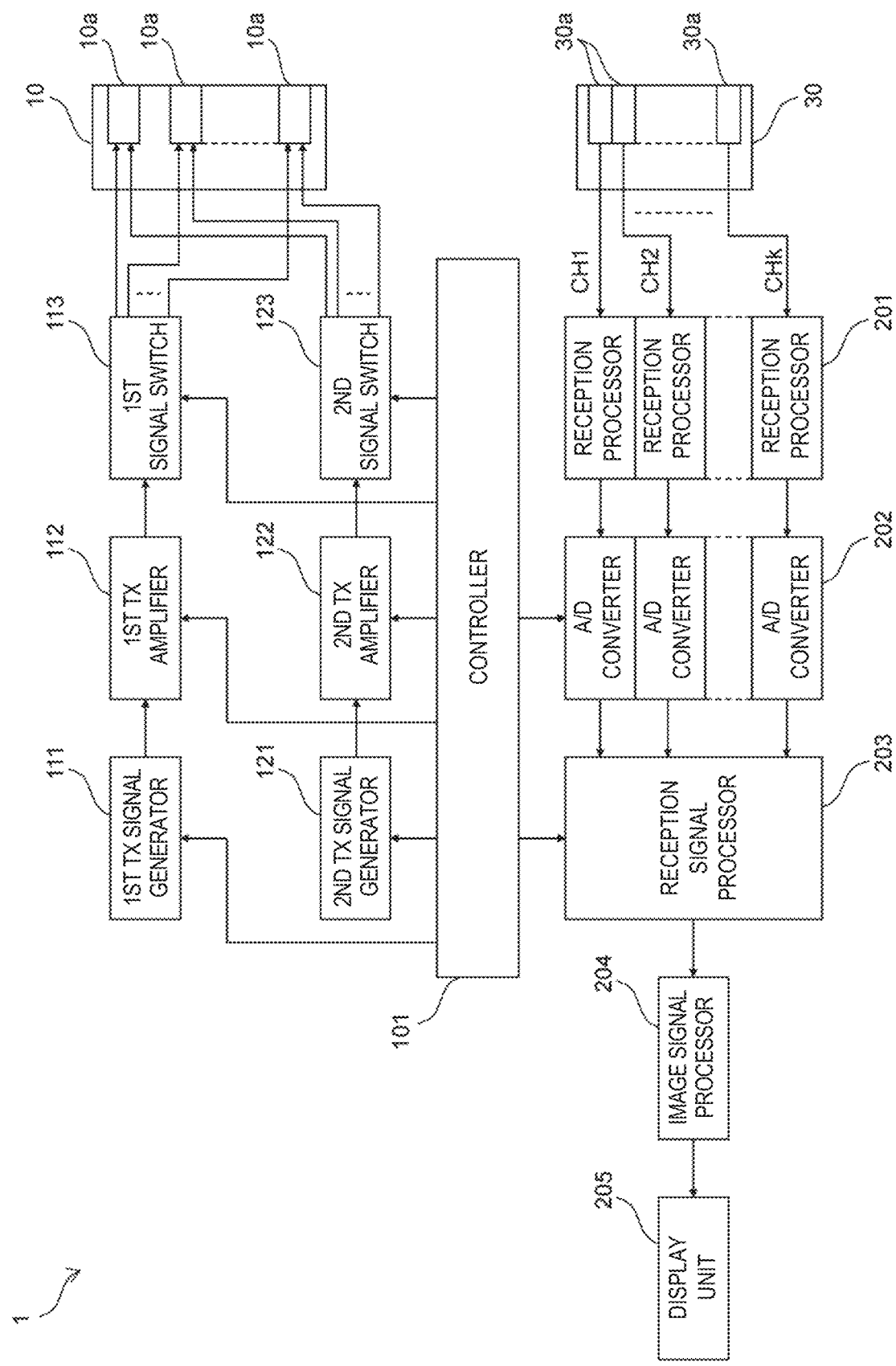
FIG. 10 is a block diagram illustrating a concrete configuration of a target object detecting device, according to one embodiment.

FIG. 10 is a block diagram illustrating a concrete configuration of a target object detecting device 1.

The target object detecting device 1 may be provided with the above-described wave transmitting array 10 as a configuration of the wave transmitting system. The wave transmitting array 10 may have a similar configuration to FIG. 9. The target object detecting device 1 may include, as a configuration for supplying the transmission signal to each wave transmitting element 10a of the wave transmitting array 10, a first transmission signal generator 111 and a second transmission signal generator 121, a first transmission amplifier 112 and a second transmission amplifier 122, and a first signal switch 113 and a second signal switch 123.

The first transmission signal generator 111 may generate the first transmission signal S11 according to the control from a controller 101. The first transmission signal S11 may be a signal used for the odd-numbered sweep as described above, and may be a signal obtained by weighting the frequency-modulated transmission signal for one pulse with each window applied in the odd-numbered sweep period.

The second transmission signal generator 121 may generate the second transmission signal S12 according to the control from the controller 101. Further, the second transmission signal S12 may be a signal used for the even-numbered sweep as described above, and may be a signal obtained by weighting the frequency-modulated transmission signal for one pulse with each window applied in the even-numbered sweep period.

The first transmission amplifier 112 may amplify the first transmission signal S11 inputted from the first transmission signal generator 111 according to the control from the controller 101. The first signal switch 113 may sequentially supply the first transmission signal S11 to the plurality of wave transmitting elements 10a included in the wave transmitting array 10 according to the control from the controller 101. The first signal switch 113 may have a similar configuration to the first signal switch 21 of FIG. 9. The first signal switch 113 may be comprised of a demultiplexer, for example.

The second transmission amplifier 122 may amplify the second transmission signal S12 inputted from the second transmission signal generator 121 according to the control from the controller 101. The second signal switch 123 may sequentially supply the second transmission signal S12 to the plurality of wave transmitting elements 10a included in the wave transmitting array 10 according to the control from the controller 101. The second signal switch 123 may have a similar configuration to the second signal switch 22 of FIG. 9. The second signal switch 123 may be comprised of a demultiplexer, for example.

The controller 101 may include a processing circuit, such as a CPU (Central Processing Unit), and a storage medium, such as a ROM (Read Only Memory), a RAM (Random Access Memory), and a hard disk drive. The controller 101 may be comprised of an integrated circuit, such as an FPGA (Field-Programmable Gate Array).

The controller 101 may control the first transmission signal generator 111 and the second transmission signal generator 121, the first transmission amplifier 112 and the second transmission amplifier 122, and the first signal switch 113 and the second signal switch 123 so that the sweep of the wave transmitting array 10 by the second transmission signal S12 is started at a timing before the sweep period of the wave transmitting array 10 by the first transmission signal S11 ends as described above. Thus, the sweep period of the wave transmitting array 10 by the first transmission signal S11 may partially overlap with the sweep period of the wave transmitting array 10 by the second transmission signal S12. For example, the controller 101 performs a transmission control so that the sweep of the wave transmitting array 10 by the second transmission signal S12 is started at an intermediate timing of the sweep period of the wave transmitting array 10 by the first transmission signal S11.

By such a transmission control, the equifrequency surfaces of which the amounts of change in the frequency by the Doppler effect are the same may be formed in the transmission beam TB1. Further, in this control, the controller 101 may apply each window illustrated in FIG. 7 to the first transmission signal S11 and the second transmission signal S12. Therefore, the side lobes and the ripples may be suppressed as described above.

The target object detecting device 1 may be provided with the above-described wave receiving array 30 as a configuration of the wave receiving system. The wave receiving array 30 may have a similar configuration to FIG. 4. "k" pieces of wave receiving elements 30a may be disposed in the wave receiving array 30. The reception signal may be outputted from the wave receiving elements 30a to channels CH1 to CHk corresponding to the respective wave receiving elements 30a.

The target object detecting device 1 may include a plurality of reception processors 201, a plurality of A/D converters 202, a reception signal processor 203, and an image signal processor 204, as a configuration for processing the reception signal outputted from each wave receiving element 30a of the wave receiving array 30 and generating the detection image.

The plurality of reception processors 201 may be connected to the channels CH1 to CHk, respectively. Each reception processor 201 may perform, for the inputted reception signal, processing for removing an unnecessary band, processing for amplifying the reception signal to a level suitable for an A/D conversion, processing for removing a signal component of a band of more than half of the sampling period of the A/D conversion, etc. The plurality of A/D converters 202 may be associated with the plurality of reception processors 201, respectively. Each A/D converter 202 may convert the analog reception signal inputted from the corresponding reception processor 201 into a digital signal at a given sampling period.

The reception signal processor 203 may process the reception signals of the channels CH1 to CHk respectively inputted from the plurality of A/D converters 202 to calculate the intensity data (volume data) of the reception signals which are distributed three-dimensionally over the detection area. The reception signal processor 203 may be comprised of a single integrated circuit (FPGA etc.) together with the controller 101.

The image signal processor 204 may process the intensity data (volume data) inputted from the reception signal processor 203 to generate image data for imaging a state of the target object within the detection area. The image signal processor 204 may be comprised of a CPU, for example. The display unit 205 may be comprised of a monitor etc., which displays a detection image according to the image data inputted from the image signal processor 204.

FIG. 11A is a functional block diagram illustrating one example of a configuration of the reception signal processor 203.

The reception signal processor 203 may include a processing circuit and a storage medium. The reception signal processor 203 may perform a function of each functional block illustrated in FIG. 11A by the program stored in the storage medium. A part of the functions of FIG. 11A may be realized not by software but by hardware using a logic circuit.

The reception signal processor 203 may include a plurality of digital filters 211, a buffer 212, a plurality of matched filters 213, and a plurality of beamformers 214.

The plurality of digital filters 211 may be provided corresponding to the plurality of A/D converters 202 of FIG. 10. The digital filter 211 may be a filter sharper than the filtering function in the reception processor 201 of FIG. 10, and remove a signal of an unnecessary band in the reception signal.

The buffer 212 may temporarily hold the reception signals of the channels CH1 to CHk respectively outputted from the plurality of digital filters 211. The buffer 212 may hold in a time-series manner the reception signals per unit pulse period during which the plurality of wave transmitting elements 10a of the wave transmitting array 10 are swept a plurality of times. The buffer 212 may sequentially supply the reception signals of the unit pulse period to the plurality of matched filters 213. When the reception signals of the unit pulse period are supplied to the plurality of matched filters 213, the buffer 212 may erase the reception signals of the unit pulse period.

The plurality of matched filters 213 may carry out a pulse-compression of the inputted reception signals of the unit pulse period of the channels CH1 to CHk, for each equifrequency surface. The matched filter 213 may be provided for every equifrequency surface. That is, the equifrequency surfaces may be defined corresponding to the number of matched filters 213. The resolution of the reception signal in the stacking direction of the equifrequency surfaces may increase as the number of matched filters 213 increases. A parameter value according to the ideal transmission waveform of the corresponding equifrequency surface may be set to each matched filter 213. The equifrequency surface associated with each matched filter 213 may be preferred to be an equifrequency surface which satisfies the above-described Formula (5). The matched filter 213 may generate a signal (hereinafter, referred to as an "equifrequency reception signal") obtained by carrying out a pulse compression of the reception signal for the unit pulse period of the channels CH1 to CHk with the ideal waveform set for itself, and supply it to the beamformer 214.

The plurality of beamformers 214 may be provided corresponding to the plurality of matched filters 213. The beamformer 214 may form the reception beam RB1 by beamforming based on a phase control or a delay control, and separate the equifrequency reception signal in the θ1 direction in FIG. 4 at a given resolution. Therefore, the equifrequency reception signals within an area where the reception beam RB1 intersects with the equifrequency surface defined by the matched filter 213 may be acquired. That is, the equifrequency reception signals within the crossing area where a first equifrequency surface S1 intersects with the reception beam RB1 in each direction (the θ1 direction in FIG. 4) parallel to the horizontal plane may be acquired from the top beamformer 214.

The obtained equifrequency reception signal may change in the intensity on the time axis according to the intensity of the reflection wave from the crossing area. This time axis may correspond to a distance from the wave receiving array 30 in the crossing area. Therefore, by mapping each intensity on the time axis in the crossing area, at a corresponding distance position from the wave receiving array 30, a distribution of the intensity data on the crossing area may be acquired. Thus, by integrating the distribution of the intensity data for each direction outputted from each beamformer 214, the volume data in which the intensity data is distributed three-dimensionally over the detection area may be acquired.

FIG. 11B is a functional block diagram illustrating another example of the configuration of the reception signal processor 203.

In this example configuration, after the reception signal of each channel is frequency-converted by an FFT (Fast Fourier Transform) 221, it may be pulse-compressed by a matched filter 222 for every channel within the frequency range. The matched filter 222 may perform a pulse compression for every equifrequency surface similarly to the case of FIG. 11A. Then, the pulse-compressed signal of each channel may be converted into a time domain by an IFFT (Inverse Fourier Transform) 223. Thus, the equifrequency surface reception signal may be generated for every equifrequency surface. The generated equifrequency reception signal of each equifrequency surface may be outputted to the corresponding beamformer 214. The subsequent processing may be similar to the case of FIG. 11A.

Also by this configuration, similarly to the configuration of FIG. 11A, by integrating the distribution of the intensity data for each direction outputted from each beamformer 214, the volume data in which the intensity data are distributed three-dimensionally over the detection area may be acquired. Note that, in the example configuration of FIG. 11B, since the pulse compression by the matched filter 222 is performed in the frequency domain, it can reduce the operation amount of the pulse compression as compared to the example configuration of FIG. 11A. Further, in the example configuration of FIG. 11B, the matched filter for acquiring the equifrequency reception signal can be set more finely than in the example configuration of FIG. 11A. Therefore, the number of equifrequency surfaces to be processed can be increased, and the resolution of the equifrequency reception signal in a stacking direction of the equifrequency surfaces can be raised.

Figure 12B:
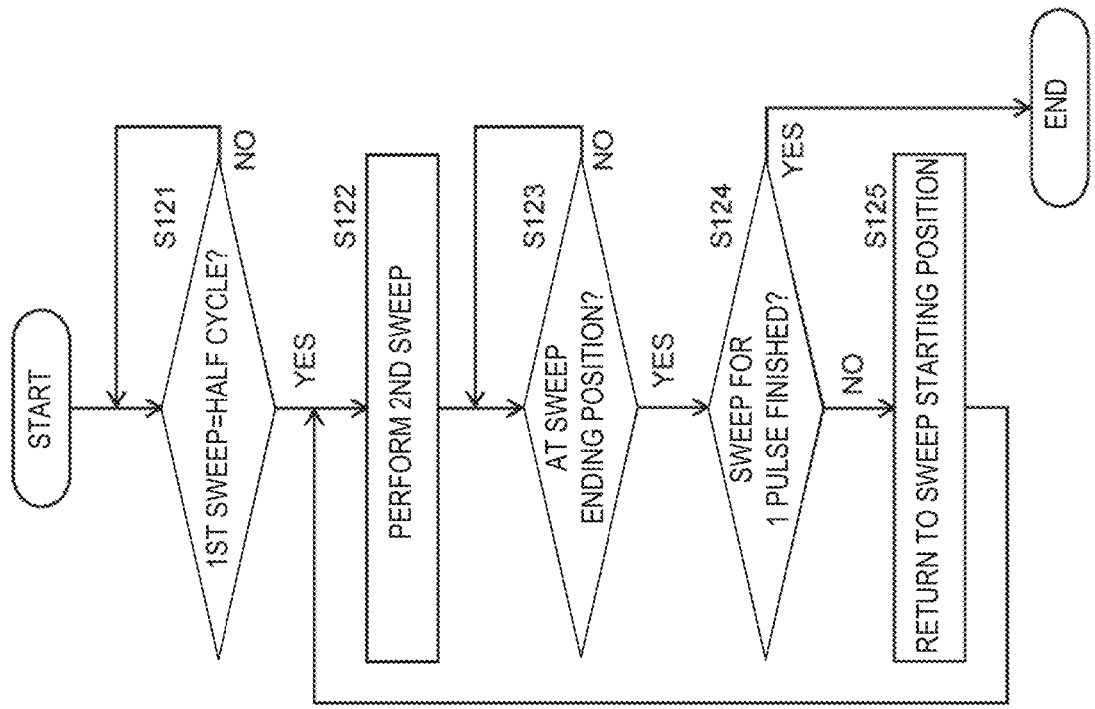
FIG. 12B is a flowchart illustrating processing when transmitting a transmission wave based on a second transmission signal from the wave transmitting array, according to one embodiment.
Figure 12A:
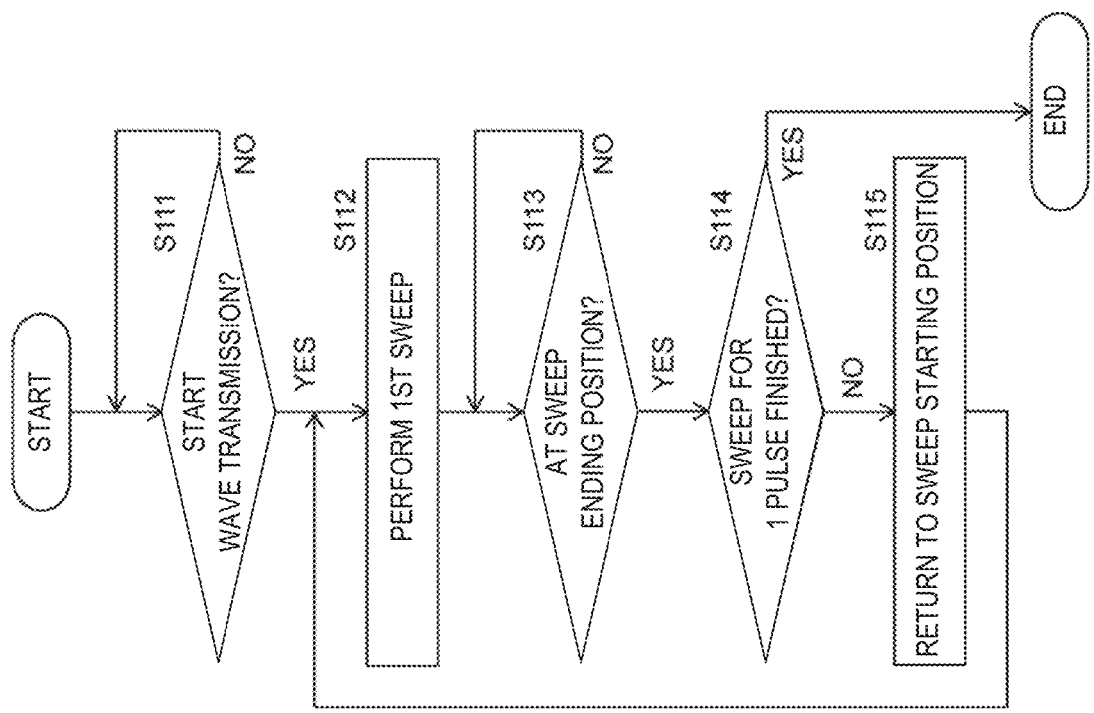
FIG. 12A is a flowchart illustrating processing when transmitting a transmission wave based on a first transmission signal from the wave transmitting array, according to one embodiment.

FIGS. 12A and 12B are flowcharts illustrating wave transmission processing performed by the controller 101 of FIG. 10. This processing may be continuously performed during detection operation, and it may be ended according to the termination of the detection operation.

FIG. 12A illustrates wave transmission processing for the odd-numbered sweep using the first signal switch 113, and FIG. 12B illustrates wave transmission processing for the even-numbered sweep using the second signal switch 123.

Referring to FIG. 12A, if it is a start timing of the wave transmission for one pulse (S111: YES), the controller 101 may perform a first sweep using the first signal switch 113 (S112). In detail, the controller 101 may cause the first transmission signal generator 111 to generate the first transmission signal S11, and control the first signal switch 113 to switch the wave transmitting element 10a which is the supply destination of the first transmission signal S11 sequentially from the first wave transmitting element 10a to the final wave transmitting element 10a. Thus, if the switching is finished up to the final wave transmitting element 10a (S113: YES), the controller 101 may determine whether the control to be performed for the wave transmission for one pulse is finished (that is, whether the odd-numbered sweep has been repeated for the number of times for one pulse) (S114).

If the determination of Step S114 is NO, the controller 101 may return the sweep position back to the first wave transmitting element 10a (S115), and repeat the first sweep (S112). Thus, if the odd-numbered sweep has been repeated for the preset number of times (S114: YES), the controller 101 may end the odd-numbered sweep control using the first signal switch 113.

Referring to FIG. 12B, if it is a timing of the half cycle of the sweep period after the first sweep of FIG. 12A is started (S121: YES), the controller 101 may perform a second sweep using the second signal switch 123 (S122). In detail, the controller 101 may cause the second transmission signal generator 121 to generate the second transmission signal S12, and control the second signal switch 123 to switch the wave transmitting element 10a which is the supply destination of the second transmission signal S12 sequentially from the first wave transmitting element 10a to the final wave transmitting element 10a. Thus, if the switching is finished up to the final wave transmitting element 10a (S123: YES), the controller 101 may determine whether the control to be performed for the wave transmission for one pulse is finished (that is, whether the even-numbered sweep has been repeated for the number of times for one pulse) (S124).

If the determination of Step S124 is NO, the controller 101 may return the sweep position back to the first wave transmitting element 10a (S125), and repeat the second sweep (S122). Thus, if the even-numbered sweep has been repeated for the preset number of times (S124: YES), the controller 101 may end the even-numbered sweep control using the second signal switch 123.

By the controls of FIGS. 12A and 12B, the transmission beam TB1 having a large number of equifrequency surfaces may be formed.

Figure 13:
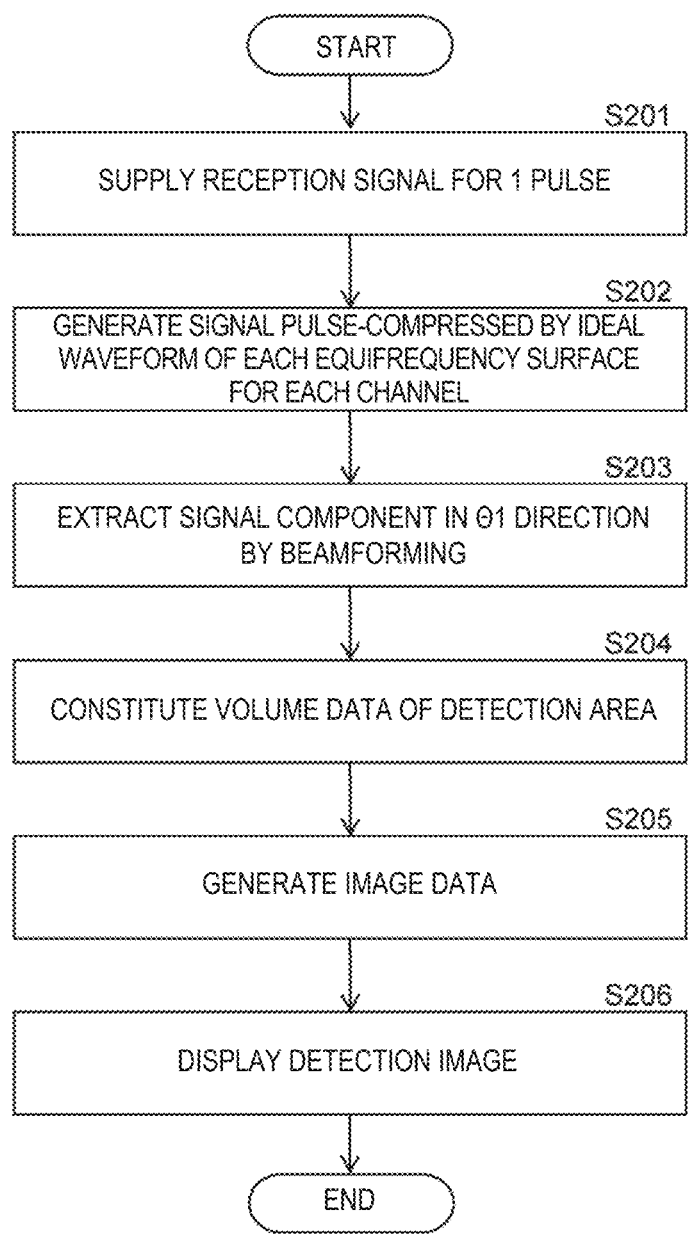
FIG. 13 is a flowchart illustrating processing in which a reception signal is processed and a detection image is displayed, according to one embodiment.

FIG. 13 is a flowchart illustrating processing for processing the reception signal and displaying the detection image.

The reception signals for the unit pulse period may be supplied to the plurality of matched filters 213 from the buffer 212, respectively (S201). Each matched filter 213 may generate the signal (equifrequency reception signal) which is obtained by carrying out the pulse compression of the inputted reception signal of each channel with the ideal waveform of the equifrequency surface set for itself, and supply it to the corresponding beamformer 214 (S202).

The beamformer 214 may extract the signal component in each horizontal direction (θ1 direction) from the inputted equifrequency reception signal by the beamforming (S203). Therefore, the distribution of the intensity data in which the intensity data of the reception signal are mapped in each equifrequency surface may be acquired. The reception signal processor 203 may integrate the intensity data from all the beamformers 214, and constitute the volume data in which the intensity data are distributed three-dimensionally over the detection area (S204). The reception signal processor 203 may supply the volume data to the image signal processor 204.

The image signal processor 204 may process the volume data to generate the image data for indicating the detection situation of the target objects within the detection area, and supply the generated image data to the display unit 205 (S205). The display unit 205 may display the image based on the inputted image data (S206). Thus, the detection situation of the target objects within the detection area may be displayed. The controller 101 may repeatedly perform the processing of Steps S201 to S206, each time the transmission pulse is transmitted by the processing of FIGS. 12A and 12B.

Figure 14:
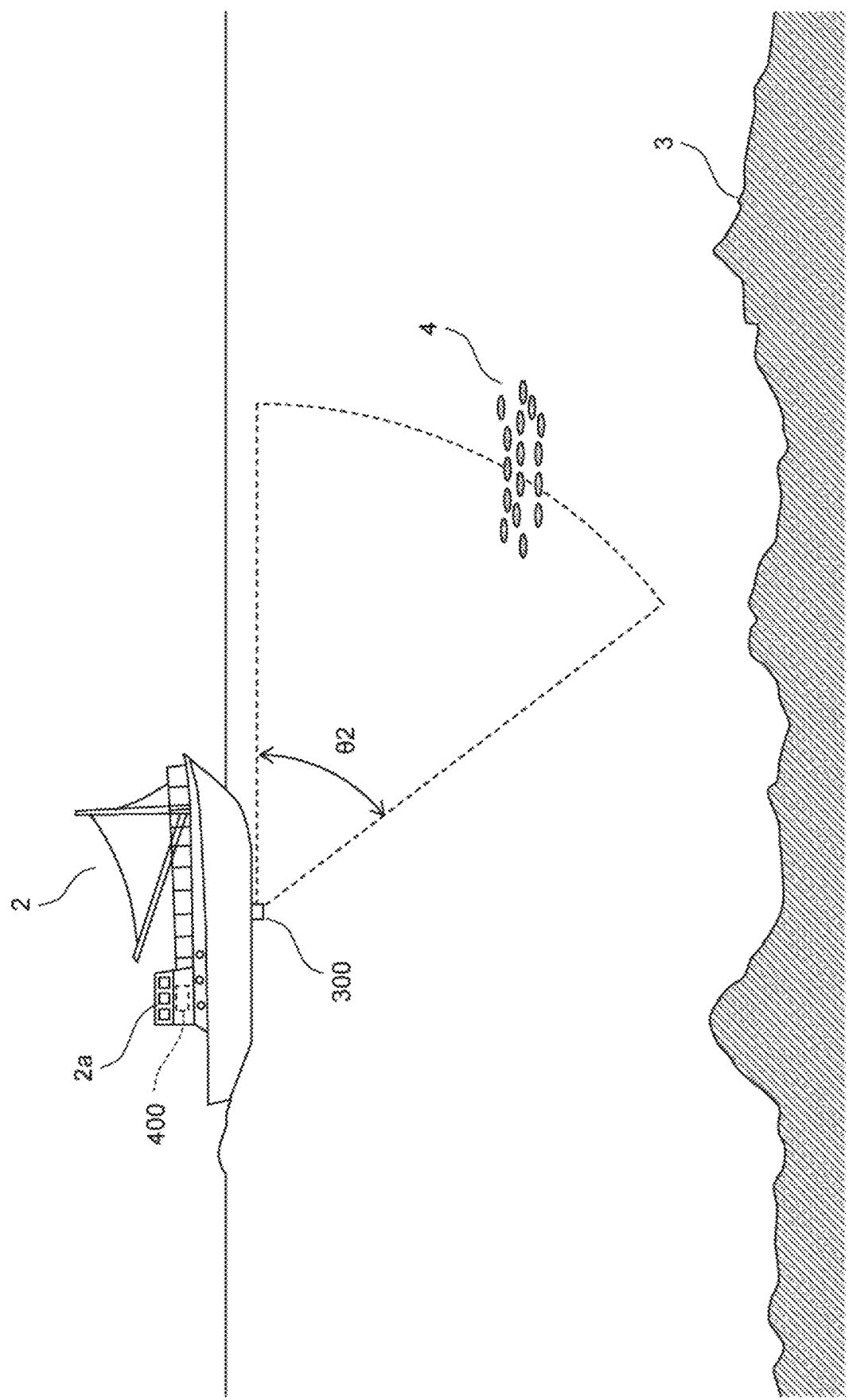
FIG. 14 is a view schematically illustrating a configuration when the target object detecting device is used as a sonar which detects an underwater target object, according to one embodiment.

FIG. 14 is a view schematically illustrating a configuration when the above-described target object detecting device 1 is used as a sonar which detects an underwater target object.

A transducer 300 may be installed at the bottom of a ship 2. The transducer 300 may include the wave transmitting array 10 and the wave receiving array 30. The wave transmitting array 10 may transmit a transmission wave underwater by the above-described processing. Here, a sound wave (for example, an ultrasonic wave) may be transmitted as the transmission wave. Thus, within the range of an angle θ2 parallel to a vertical plane, the transmission beam TB1 in which the equifrequency surfaces are stacked in the angular direction may be formed.

Among the configuration of FIG. 10, configurations other than the wave transmitting array 10, the wave receiving array 30, and the display unit 205 may be provided to a control device installed in a pilothouse 2a of the ship 2. The display unit 205 may be installed in the pilothouse 2a, separately from the control device. The display unit 205 may be integrated with the control device.

According to this configuration, the detection image indicative of the situation of a water bottom 3 and a school of fish 4 may be displayed on the display unit 205. Therefore, a user can grasp the underwater situation.

Note that four transducers 300 which are respectively oriented forward, rearward, leftward, and rightward may be installed in the ship bottom. In this case, the configurations of the wave transmitting system and the wave receiving system of FIG. 10 may be prepared for every transducer 300. Therefore, the detection image all around the ship can be displayed on the display unit 205.

Further, when the above-described target object detecting device 1 is used as a radar which detects a target object in the air, for example, a transducer 400 may be installed in a side wall of the pilothouse 2a. The transducer 400 may include the wave transmitting array 10 and the wave receiving array 30. The wave transmitting array 10 may transmit the transmission wave in the air by the above-described processing. Here, a radio wave may be transmitted as the transmission wave. The configuration of the circuitry may be installed in the pilothouse 2a similarly to the case of the sonar.

According to this configuration, the detection image indicative of the situation of obstacles and a flock of birds may be displayed on the display unit 205. Therefore, the user can grasp the situation in the air. Note that the transducer 400 may be installed in each of the front, rear, right, and left side surfaces of the pilothouse 2a. In this case, the configurations of the wave transmitting system and the wave receiving system of FIG. 10 may be prepared for every transducer 400. Therefore, the detection image of the space all around the ship 2 can be displayed on the display unit 205.

Effects of Embodiments

According to the embodiment, the following effects may be expected.

As illustrated in FIG. 9, by the wave transmitting element 10a to which the first transmission signal S11 is supplied being switched from the element n to the element n+1 in the wave transmitting array 10 by the first signal switch 21, the wave transmission source of the transmission wave may move in the array direction of the wave transmitting elements 10a. Thus, the frequency of the transmission beam TB1 may change in the moving direction of the wave transmission source by the Doppler effect to form the plurality of equifrequency surfaces in the transmission beam TB1. Therefore, by extracting the signal corresponding to each equifrequency surface from the reception signals generated from the wave receiving element 30a, the reception signal based on the reflection wave from each equifrequency surface (equifrequency reception signal) can be acquired.

At this time, the wave transmitting element 10a to which the second transmission signal S12 is supplied may be switched from the element m to the element m+1 inside the wave transmitting array 10 by the second signal switch 22 of FIG. 9. Thus, as illustrated in FIG. 7, the sweep of the wave transmitting array 10 by the first signal switch 21 partially may overlap with the sweep of the wave transmitting array 10 by the second signal switch 22, and it prevents that the ripple occurs in the transmission waveform and the reception processing result (equifrequency reception signal), as illustrated in FIGS. 8A and 8B. Therefore, the detection accuracy of the target object can be raised.

Thus, according to this embodiment, the target object in each equifrequency surface can be detected with sufficient accuracy by the simple configuration in which the wave transmitting element 10a to which the first transmission signal S11 and the second transmission signal S12 are supplied is switched inside the wave transmitting array 10.

Further, in this embodiment, inside the wave transmitting array 10, the element n+1 may be adjacent to the element n, and the element m+1 may be adjacent to the element m. Further, the wave transmitting element 10a to which the first transmission signal S11 is supplied may be switched from the element n+1 to the element n+2 which is adjacent to the element n+1, and the wave transmitting element 10a to which the second transmission signal S12 is supplied may be switched from the element m+1 to an element m+2 which is adjacent to the element m+1. Thus, since the first transmission signal S11 and the second transmission signal S12 are supplied sequentially to the adjacent wave transmitting elements 10a, the wave transmission source of the transmission wave can be finely moved in the array direction of the wave transmitting element 10a. Therefore, the change in the frequency by the Doppler effect can be caused smoothly.

Note that, in this embodiment, if the wave transmitting array 10 is provided with "P" pieces of wave transmitting elements 10a and P is an even number, it may be preferred that "(P/2)−1" pieces of wave transmitting elements 10a are included between the element n and the element m, and if P is an odd number, it may be preferred that "(P−1)/2" pieces, or "{(P−1)/2}−1" pieces of wave transmitting elements 10a are included between the element n and the element m. By thus setting the element n and the element m, the sweep of the wave transmitting array 10 by the second signal switch 22 may be started near the middle of the cycle during which the wave transmitting array 10 is swept by the first signal switch 21. Therefore, each sweep can be overlapped by ½ cycle, and the ripple which is generated in the transmission wave and the reception processing result can be suppressed more effectively. Further, in this case, as compared with the case of FIG. 5, the repeating period of the sweep is half, and therefore, the chirp bandwidth can be doubled and the distance resolution of the target object detection can be raised.

Further, if the wave transmitting array 10 is provided with P pieces of wave transmitting elements 10a from wave transmitting element 1 to wave transmitting element P, when the element n+1 corresponds to the wave transmitting element 10a beyond the wave transmitting element P, the first signal switch 21 may switch the wave transmitting element 10a to which the first transmission signal S11 is supplied from the wave transmitting element P to the wave transmitting element 1, and when the element m+1 corresponds to the wave transmitting element 10a beyond the wave transmitting element P, the second signal switch 22 may switch the wave transmitting element 10a to which the second transmission signal S12 is supplied from the wave transmitting element P to the wave transmitting element 1. Thus, the wave transmitting array 10 may be repeatedly swept by the first transmission signal S11 and the second transmission signal S12. Therefore, the transmitting energy for one pulse can be raised, and the detectable distance range can be expanded.

Further, in the above embodiment, the first transmission signal S11 may be a frequency-modulated signal, and the second transmission signal S12 may be a frequency-modulated signal. Thus, by performing the reception processing using the matched filter 213 as illustrated in FIGS. 11A and 11B, the distance resolution of the target object detection can be raised.

Note that, in this embodiment, a first part of the first transmission signal S11 may be supplied to the element n, and a second part of the first transmission signal S11 different from the first part may be supplied to the element n+1, and a first part of the second transmission signal S12 may be supplied to the element m, and a second part of the second transmission signal S12 different from the first part of the second transmission signal S12 may be supplied to the element m+1. Further, in the above embodiment, since the first transmission signal S11 and the second transmission signals S12 are the frequency-modulated signals, such as the chirp signals, the parts of the signal waveform supplied to the element n and the element n+1 may be different, and the parts of the signal waveform supplied to the element m and the element m+1 may be different.

Further, as described with reference to FIGS. 11A and 11B, the reception signal processor 203 may be provided with the configuration (matched filters 213 and 222) which extracts, based on the frequency component of the reception signal, the reception signal (equifrequency reception signal) based on the reflection wave from the corresponding equifrequency surface corresponding to the frequency. Therefore, the equifrequency reception signal corresponding to each equifrequency surface can be smoothly acquired.

Further, as illustrated in FIG. 4, it may be constituted so that the reception beam RB1 generated based on the reception signal which is generated from each wave receiving element 30a intersects with the transmission beam TB1 generated by the wave transmitting array 10. Therefore, the distribution of the intensity data based on the intensity of the reflection wave can be calculated within the area where the reception beam RB1 intersects with the transmission beam TB1 (equifrequency surface). Therefore, by changing the orientation of the reception beam by beamforming within the detection area, the intensity data which are distributed three-dimensionally over the detection area can be constituted.

Modifications

Although in the above embodiment the first transmission signal S11 and the second transmission signal S12 are supplied to one wave transmitting element 10a, a plurality of wave transmitting elements 10a may be grouped, and the first transmission signal S11 and the second transmission signal S12 may be supplied to each group.

Figure 15:
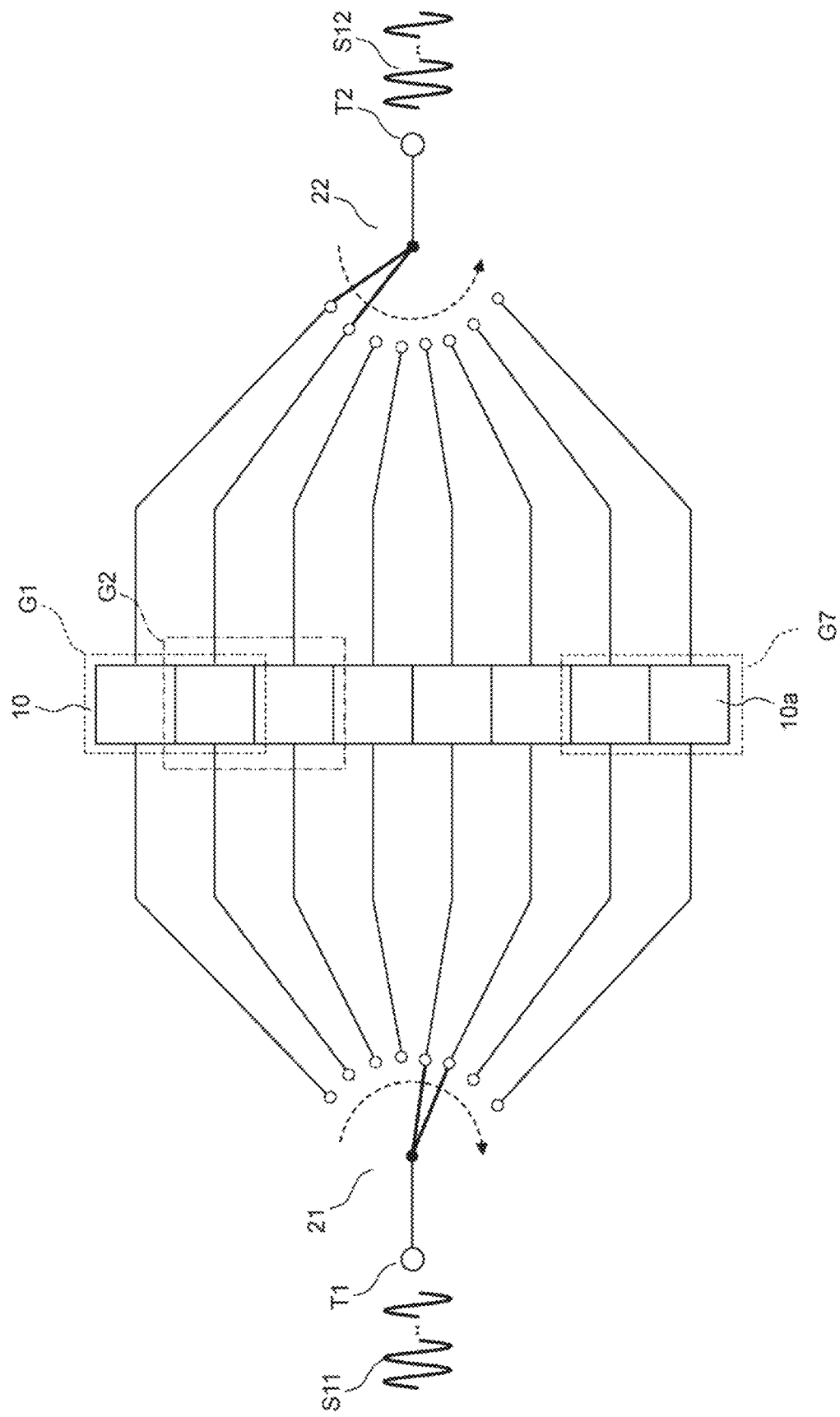
FIG. 15 is a view illustrating a configuration when a first transmission signal and a second transmission signal are supplied per group of wave transmitting elements, according to a modification of the embodiment.

FIG. 15 is a view illustrating a configuration in the case where the first transmission signal S11 and the second transmission signal S12 are supplied to each group of wave transmitting elements 10a.

In the example configuration of FIG. 15, each group may include two wave transmitting elements 10a. A group G1 may be constituted from the top two wave transmitting elements 10a, and a group G2 may be constituted from the top second and third wave transmitting elements 10a. The two wave transmitting elements 10a included in the adjacent groups may be offset in the up-down direction by one element. In the example configuration of FIG. 15, seven groups from the group G1 to a group G7 may be constituted.

The first signal switch 21 and the second signal switch 22 may be provided with one input terminal and two output terminals, and the two output terminals may be connected simultaneously to the wave transmitting elements 10a of each group. Therefore, the first transmission signal S11 or the second transmission signal S12 may be simultaneously supplied to the wave transmitting elements 10a of each group. The first signal switch 21 may switch the group to which the first transmission signal S11 is supplied from a group g to a group g+1, and the second signal switch 22 may switch the group to which the second transmission signal S12 is supplied from a group h to a group h+1. Thus, when the output-side terminals of the first signal switch 21 and the second signal switch 22 are switched sequentially, the supply destination of the first transmission signal S11 or the second transmission signal S12 may be switched sequentially to the next group. Therefore, the sweep of the wave transmitting array 10 may be performed per group.

Also in this modification, a circuit configuration similar to FIG. 10 and FIGS. 11A and 11B may be applied. In this case, the configurations of the first signal switch 113 and the second signal switch 123 of FIG. 10, and the wave transmitting array 10 may be replaced with the configuration of FIG. 15. Similarly to the above, the controller 101 may control each part of the wave transmitting system so that the sweep by the first signal switch 113 and the sweep by the second signal switch 123 are partially overlapped with each other. For example, the controller 101 controls each part of the wave transmitting system so that the sweep by the first signal switch 113 and the sweep by the second signal switch 123 are overlapped with each other substantially by half cycle.

In this modification, the wave transmission source of the transmission wave may be moved by switching the transmission destination of the transmission signal per group. Therefore, similarly to the above embodiment, the transmission beam can be changed in the frequency by the Doppler effect. Further, since the sweep by the first signal switch 113 and the sweep by the second signal switch 123 are partially overlapped, it prevents that the ripple occurs in the transmission wave, similarly to the above embodiment. Further, according to this modification, since the transmission wave is transmitted per group, the output and the directional gain of the transmission wave can be raised.

Note that, although in the example configuration of FIG. 15 one group is constituted by two wave transmitting elements 10a, one group may be constituted by three or more wave transmitting elements 10a. Also in this case, the wave transmission source of the transmission wave may be moved by switching the transmission destination of the transmission signal per group.

Second Embodiment

In the above embodiment, the wave transmission may be performed using one wave transmitting array 10. On the other hand, in a second embodiment, the wave transmission may be performed using two wave transmitting arrays.

Figure 16:
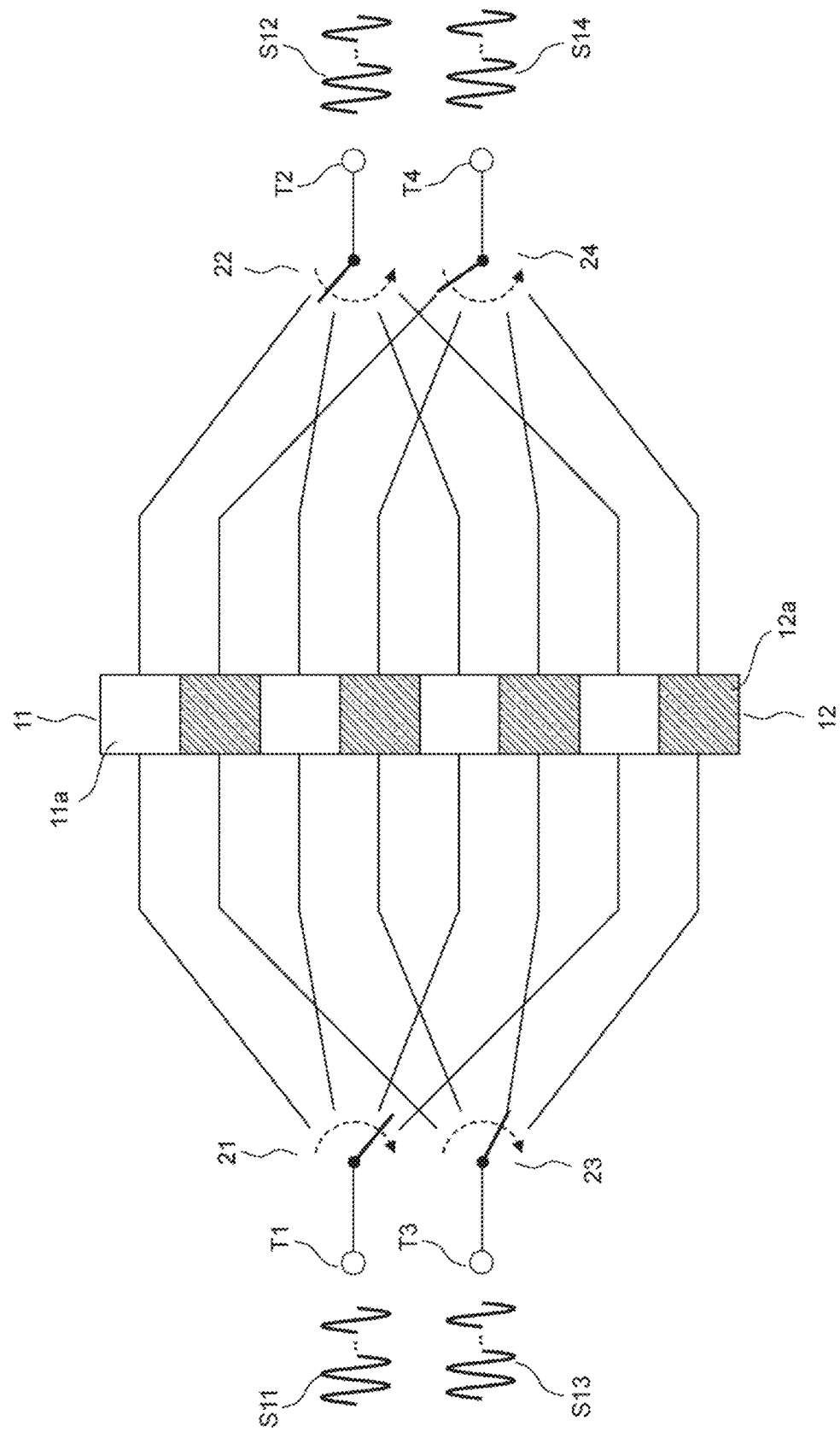
FIG. 16 is a view illustrating a configuration for transmitting waves using a first wave transmitting array and a second wave transmitting array.

FIG. 16 is a view illustrating a configuration for transmitting waves using the two wave transmitting arrays.

As illustrated in FIG. 16, in the second embodiment, the wave transmitting system may include a first wave transmitting array 11, a second wave transmitting array 12, a first signal switch 21, a second signal switch 22, a third signal switch 23, and a fourth signal switch 24. The first wave transmitting array 11 may be constituted so that a plurality of first wave transmitting elements 11a are lined up in a single row. The second wave transmitting array 12 may be constituted so that a plurality of second wave transmitting elements 12a are lined up in a single row. The second wave transmitting element 12a may be disposed between adjacent first wave transmitting elements 11a.

The first transmission signal S11 may be supplied to the terminal T1 of the first signal switch 21, and the second transmission signal S12 may be supplied to the terminal T2 of the second signal switch 22. The first signal switch 21 and the second signal switch 22 may switch the first wave transmitting elements 11a which are used as the supply destinations of the first transmission signal S11 and the second transmission signal S12 in the first transmitting array 11, respectively. Further, a third transmission signal S13 may be supplied to a terminal T3 of the third signal switch 23, and a fourth transmission signal S14 may be supplied to a terminal T4 of the fourth signal switch 24. The third signal switch 23 and the fourth signal switch 24 may switch the second wave transmitting elements 12a which are used as the supply destinations of the third transmission signal S13 and the fourth transmission signal S14 in the second wave transmitting array 12, respectively.

In the second embodiment, the third signal switch 23 may be controlled so that the wave transmission is performed by the second wave transmitting element 12a of the second wave transmitting array 12 which is sandwiched between the element n and the element n+1, at the timing when the first wave transmitting element 11a which is the supply destination of the first transmission signal S11 is switched from the element n to the element n+1 by the first signal switch 21 in the first wave transmitting array 11. Further, the fourth signal switch 24 may be controlled so that the wave transmission is performed by the second wave transmitting element 12a of the second wave transmitting array 12 which is sandwiched between the element m and the element m+1, at the timing when the first wave transmitting element 11a which is the supply destination of the second transmission signal S12 is switched from the element m to the element m+1 by the second signal switch 22 in the first wave transmitting array 11.

Thus, in the second embodiment, a gap between the wave transmissions by the first transmission signal S11 may be interpolated by the wave transmission by the third transmission signal S13, and a gap between the wave transmissions by the second transmission signal S12 may be interpolated by the wave transmission by the fourth transmission signal S14.

Figure 17:
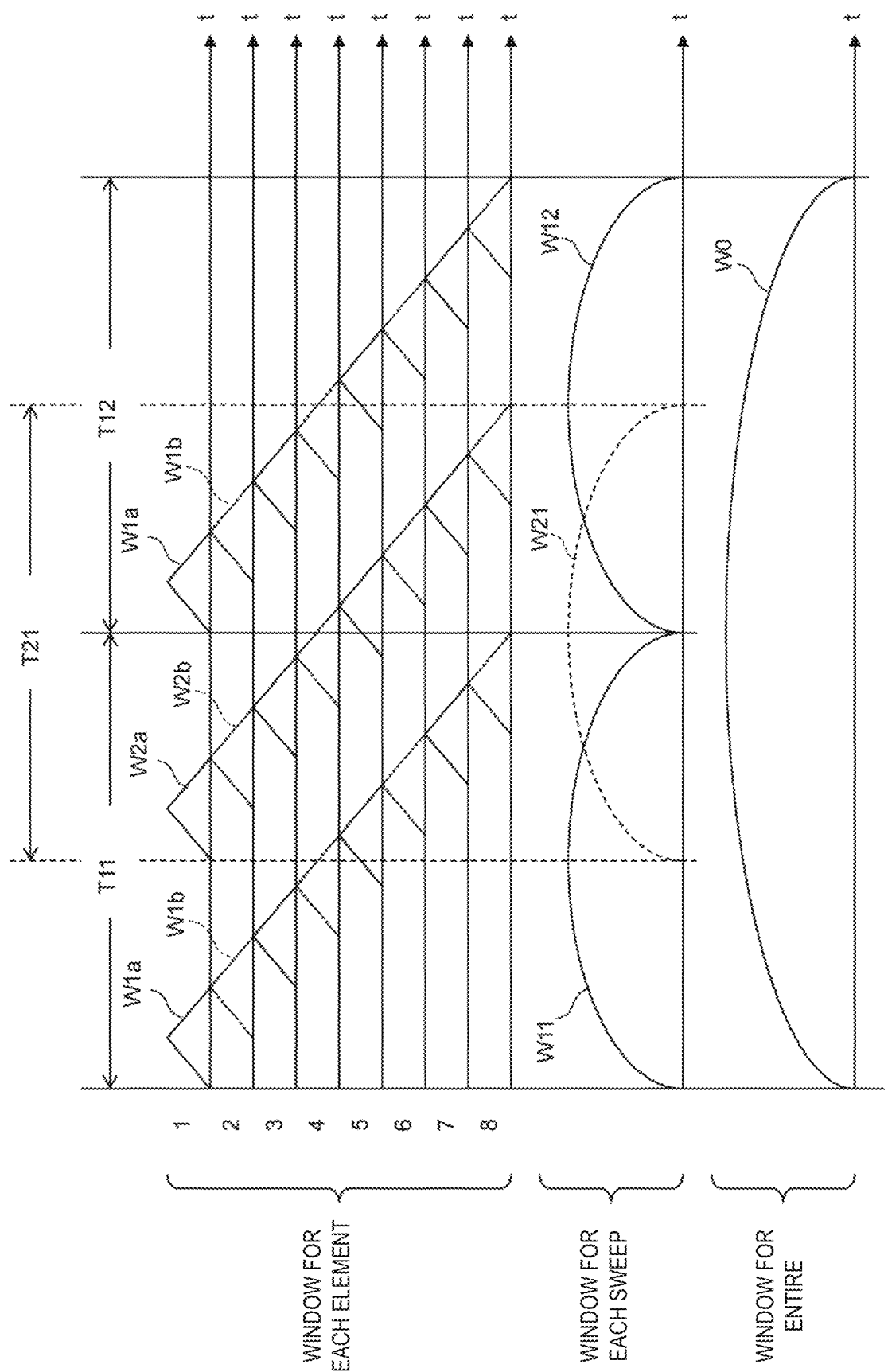
FIG. 17 is a view illustrating an example application of windows, according to a second embodiment.

FIG. 17 is a view illustrating an example application of the windows, according to the second embodiment.

Also in the example of FIG. 17, similarly to the case of FIG. 7, the sweep in the sweep period T21 may be set between the sweep in the sweep period T11 and the sweep in the sweep period T12. Also in this case, the sweep in the sweep period T21 may be started near the middle of the sweep period T11. Further, the sweep in the next sweep period T12 may be started near the middle of the sweep period T21. The windows W11, W12, and W21 illustrated by a broken line in the middle row may be set in the sweep periods T11, T12, and T21, respectively, and the window W0 may be set in the entire transmission pulse.

In the sweep periods T11 and T12, a window W1a illustrated by a solid line may be a window applied during the period where the first transmission signal S11 is supplied to the first wave transmitting element 11a by the first signal switch 21 of FIG. 16, and a window W1b illustrated by a broken line may be a window applied during the period where the third transmission signal S13 is supplied to the second wave transmitting element 12a by the third signal switch 23 of FIG. 16. Further, in the sweep period T21, a window W2a illustrated by a solid line may be a window applied during the period where the second transmission signal S12 is supplied to the first wave transmitting element 11a by the second signal switch 22 of FIG. 16, and a window W2b illustrated by a broken line may be a window applied during the period where the fourth transmission signal S14 is supplied to the second wave transmitting element 12a by the fourth signal switch 24 of FIG. 16.

In the sweep period T11, the weighting which is obtained by superimposing the window W1a, the window W11, and the window W0 may be applied to the first transmission signal S11, and the weighting which is obtained by superimposing the window W1b, the window W11, and window W0 may be applied to the third transmission signal S13. A similar application may be performed in the sweep period T12. In the sweep period T21, the weighting which is obtained by superimposing the window W2a, the window W21, and the window W0 may be applied to the second transmission signal S12, and the weighting which is obtained by superimposing the window W2b, the window W21, and the window W0 may be applied to the fourth transmission signal S14.

In the case of FIG. 17, the windows applied to the first transmission signal S11, the second transmission signal S12, the third transmission signal S13, and the fourth transmission signal S14, respectively, may be applied to the transmission signal (for example, a chirp signal) which is frequency-modulated over a period from the start time of the sweep period T11 (the start timing of the transmission pulse) to the end time of the sweep period T12 (the end timing of the transmission pulse) to generate the first transmission signal S11, the second transmission signal S12, the third transmission signal S13, and the fourth transmission signal S14.

That is, the first transmission signal S11 may be generated by applying the windows W1a, W11, and W0 of FIG. 17 to the transmission signal which is changed in the frequency. The second transmission signal S12 may be generated by applying the windows W2a, W21, and W0 of FIG. 17 to the transmission signal which is changed in the frequency. The third transmission signal S13 may be generated by applying the windows W1b, W11, and W0 of FIG. 17 to the transmission signal which is changed in the frequency. The fourth transmission signal S14 may be generated by applying the windows W2b, W21, and W0 of FIG. 17 to the transmission signal which is changed in the frequency.

Figure 18B:
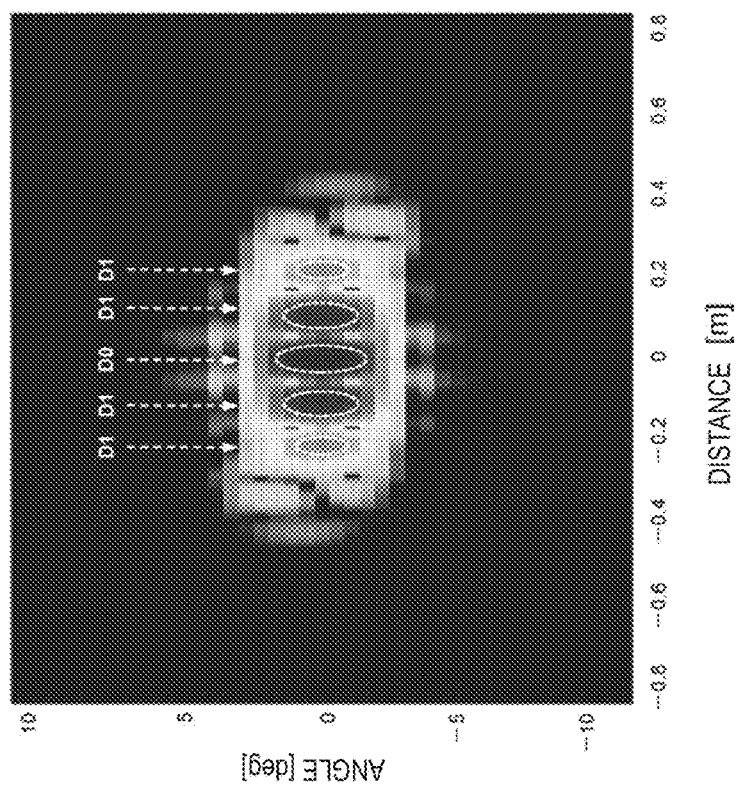
FIG. 18B is a view illustrating a simulation result when a reception processing result of carrying out reception processing of the echo of the transmission wave of FIG. 18A is obtained by a simulation.
Figure 18A:
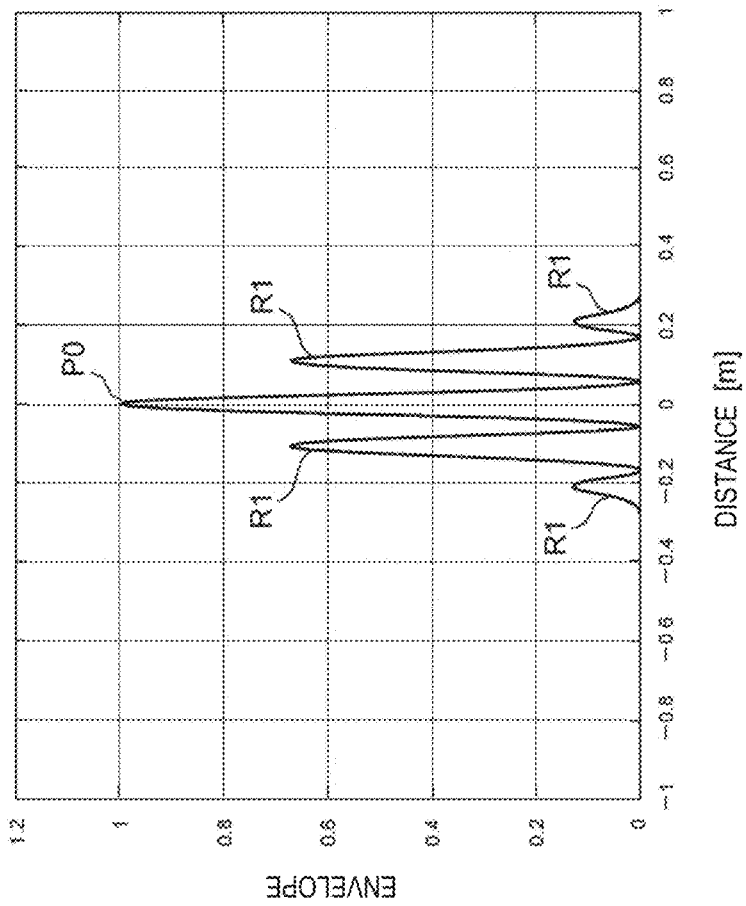
FIG. 18A is a view illustrating a simulation result of a waveform of the transmission wave, according to a comparative example of the second embodiment.

FIG. 18A is a view illustrating a simulation result according to a comparative example when a waveform of the transmission wave is obtained by a simulation, and FIG. 18B is a view illustrating a result of carrying out reception processing of the echo of this transmission wave, which is obtained by a simulation, according to the comparative example.

In the comparative example, the sweep in the sweep period T21 and the setup of the windows W2a, W2b, and W21 in FIG. 17 are omitted. Further, in the comparative example, it is assumed that the target object exists at the position of 0 degree in the sweep direction (the position in the forward direction). In the simulation of FIGS. 18A and 18B, it is assumed that the sweep is repeated five times to generate the transmission pulse of one detection unit. The vertical axis and the horizontal axis of each graph of FIGS. 18A and 18B are the same as the vertical axis and the horizontal axis of each graph of FIGS. 6A and 6B.

Also in this comparative example, as illustrated in FIG. 18A, a plurality of ripples R1 occur before and after the center waveform P0. Thus, as illustrated in FIG. 18B, in the reception processing result, a high-intensity area (a broken line elliptical area) occurs also at the distance positions D1 corresponding to the ripples R1, in addition to the normal distance position D0 of the target object. Also in this case, similarly to the case of FIG. 6B, in the detection image of the target object, an image indicative of the target object is displayed also at the distance positions D1 corresponding to the ripples R1, in addition to the normal distance position D0 of the target object.

Figure 19B:
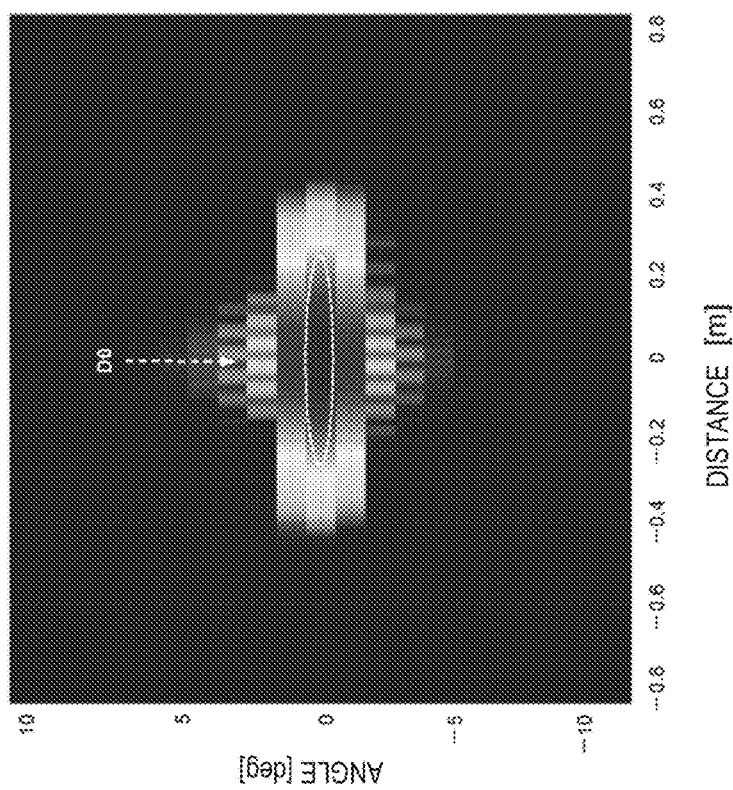
FIG. 19B is a view illustrating a simulation result when a reception processing result of carrying out reception processing of the echo of the transmission wave of FIG. 19A is obtained by a simulation.
Figure 19A:
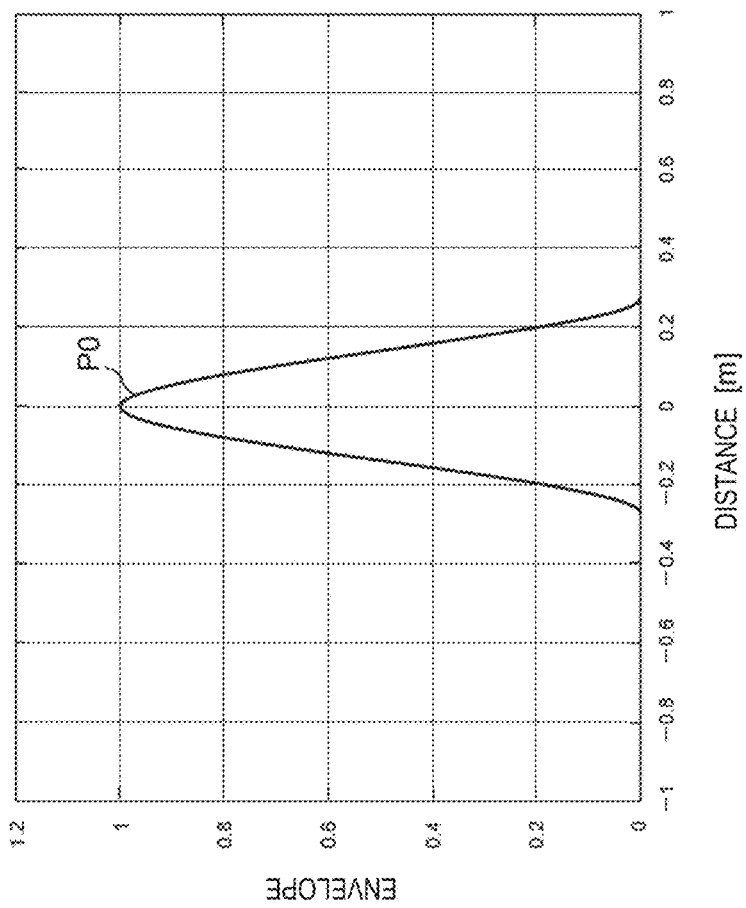
FIG. 19A is a view illustrating a simulation result of a waveform of the transmission wave, according to the second embodiment.

FIG. 19A is a view illustrating a simulation result according to the second embodiment when a waveform of the transmission wave is obtained by a simulation, and FIG. 19B is a view illustrating a result of carrying out reception processing of the echo of this transmission wave, which is obtained by a simulation, according to the second embodiment.

The simulation results of FIGS. 19A and 19B are those when the sweep period and the windows are set as illustrated in FIG. 17. That is, in this simulation, unlike the above comparative example, the sweep may be performed also in the sweep period T21 between the sweep periods T11 and T12, and the windows W2a, W2b, and W21 may be set to this sweep period T21.

Also in the simulation of FIGS. 19A and 19B, it may be assumed that the sweep is repeated five times to generate the transmission pulse of one detection unit. The vertical axis and the horizontal axis of each graph of FIGS. 19A and 19B are the same as the vertical axis and the horizontal axis of each graph of FIGS. 8A and 8B.

As illustrated in FIG. 19A, in the second embodiment, the ripples R1 as illustrated in FIG. 18A do not occur, and the transmission waveform may become a waveform P0 with a single peak. Therefore, as illustrated in FIG. 19B, in the reception processing result, a high-intensity area (a broken line elliptical area) may occur only at the normal distance position D0 of the target object. In the simulation result of FIG. 19B, the high-intensity area may be concentrated more densely at the normal distance position, as compared with FIG. 8B. Thus, in the detection image of the target object, an image indicative of the target object may be displayed only at the normal distance position of the target object. Therefore, according to the sweeping method of the second embodiment, the position of the target object can be displayed more clearly in the detection image, and the accuracy of the image indicative of the target object can be raised.

Figure 20:
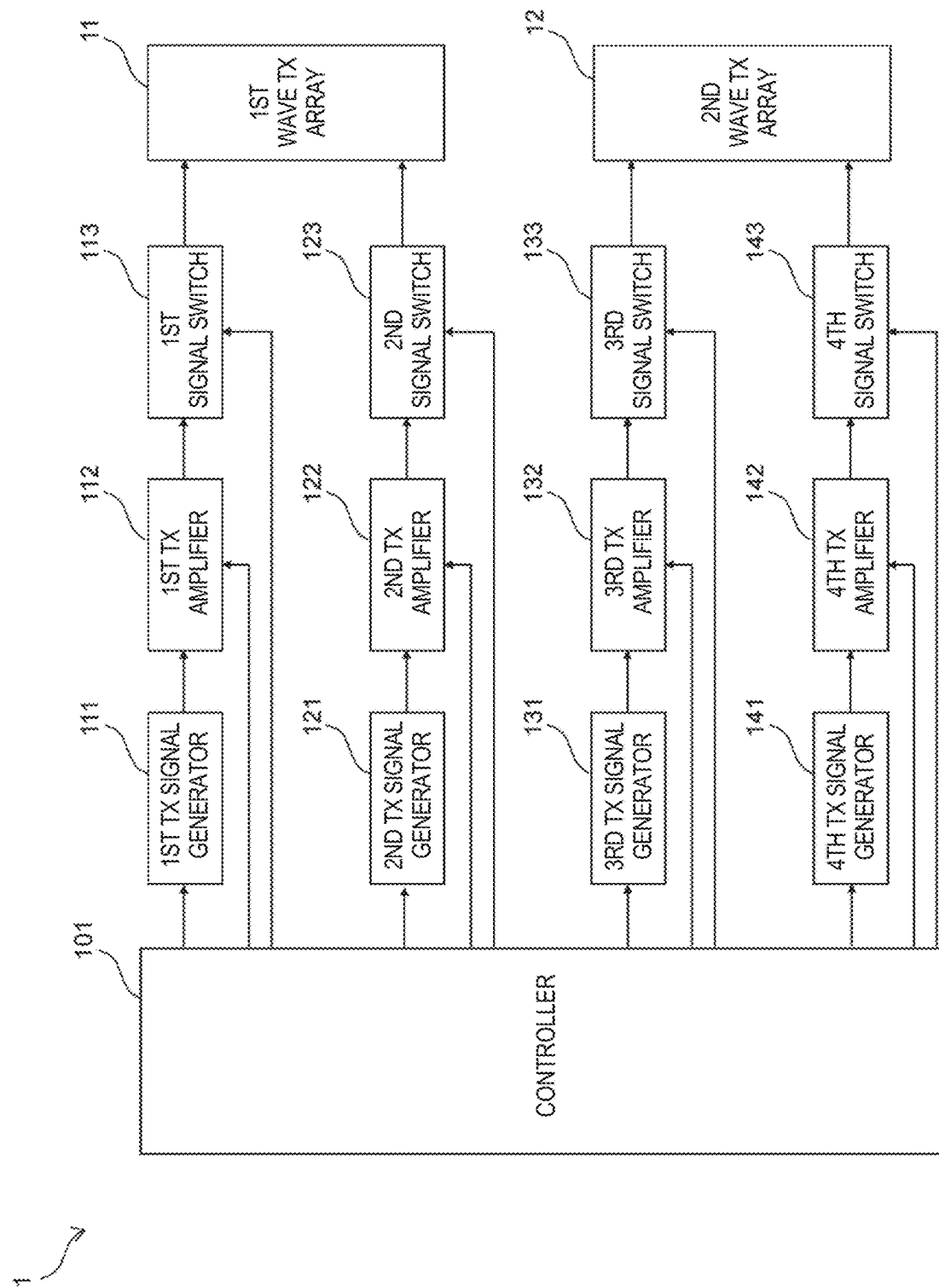
FIG. 20 is a block diagram illustrating a concrete configuration of a target object detecting device according to the second embodiment.

FIG. 20 is a block diagram illustrating a concrete configuration of the target object detecting device 1 according to the second embodiment.

For convenience, only the configuration of the wave transmitting system is illustrated in FIG. 20. The configuration of the wave receiving system of the target object detecting device 1 may be similar to that of FIG. 10.

As illustrated in FIG. 20, the target object detecting device 1 may include the first transmission signal generator 111, the second transmission signal generator 121, a third transmission signal generator 131, and a fourth transmission signal generator 141 which generate the first transmission signal S11, the second transmission signal S12, the third transmission signal S13, and the fourth transmission signal S14, respectively, which are described above. The first transmission signal S11, the second transmission signal S12, the third transmission signal S13, and the fourth transmission signal S14 which are generated by the first transmission signal generator 111, the second transmission signal generator 121, the third transmission signal generator 131, and the fourth transmission signal generator 141 may be respectively amplified by the first transmission amplifier 112, the second transmission amplifier 122, a third transmission amplifier 132, and a fourth transmission amplifier 142, and then may be supplied to the first signal switch 113, the second signal switch 123, a third signal switch 133, and a fourth signal switch 143.

The first signal switch 113, the second signal switch 123, the third signal switch 133, and the fourth signal switch 143 may have similar configurations to the first signal switch 21, the second signal switch 22, the third signal switch 23, and the fourth signal switch 24, respectively, of FIG. 16. The first signal switch 113 and the second signal switch 123 may switch the first wave transmitting elements 11a which are used as the supply destinations of the first transmission signal S11 and the second transmission signal S12 in the first wave transmitting array 11, respectively, as described above. Further, the third signal switch 133 and the fourth signal switch 143 may switch the second wave transmitting elements 12a which are used as the supply destinations of the third transmission signal S13 and the fourth transmission signal S14 in the second wave transmitting array 12, respectively, as described above.

The first transmission signal S11, the second transmission signal S12, the third transmission signal S13, and the fourth transmission signal S14 which are supplied to the respective wave transmitting elements may be weighted as described above by the windows illustrated in FIG. 17 in the first transmission signal generator 111, the second transmission signal generator 121, the third transmission signal generator 131, and the fourth transmission signal generator 141, respectively.

Note that, in the configuration of the wave receiving system, a parameter value of each matched filter 213 illustrated in FIG. 11A may be changed according to the generating method illustrated in FIG. 17. Also in this case, the parameter according to an ideal transmission wave in each equifrequency surface may be applied to each matched filter 213.

Effects of Second Embodiment

Also according to the configuration of the second embodiment, similarly to the case of FIG. 7, the side lobes may be suppressed by applying each window illustrated in FIG. 17. Further, similarly to the case of FIG. 7, since deep valley parts do not occur on the boundaries between the windows W11, W12, and W21, it prevents that the ripple R1 occurs in the transmission waveform.

Further, in the second embodiment, as illustrated in FIG. 17, the gap between the wave transmissions by the first transmission signal S11 may be interpolated by the wave transmission by the third transmission signal S13, and the gap between the wave transmissions by the second transmission signal S12 may be interpolated by the wave transmission by the fourth transmission signal S14. Thus, it prevents that unnecessary frequency components are superimposed on the transmission wave, and the processing based on the reception signal can be performed with higher accuracy.

Further, as illustrated in FIG. 16, inside the second wave transmitting array 12, the element n+1 may be adjacent to the element n, and the element m+1 may be adjacent to the element m, and, the element n of the first wave transmitting array 11 may be adjacent to the element n of the second wave transmitting array 12, and the element m of the first wave transmitting array 11 may be adjacent to the element m of the second wave transmitting array 12.

Therefore, while the wave transmission source of the transmission wave based on the first transmission signal S11 moves from the element n to the element n+1 in the first wave transmitting array 11, at the position between the element n and the element n+1, the transmission wave based on the third transmission signal S13 may be transmitted from the element n in the second wave transmitting array 12. Further, while the wave transmission source of the transmission wave based on the second transmission signal S12 moves from the element m to the element m+1 in the first wave transmitting array 11, at the position between the element m and the element m+1, the transmission wave based on the fourth transmission signal S14 may be transmitted from the element m in the second wave transmitting array 12. Thus, the continuity of the transmission wave becomes easier to be maintained. Therefore, it prevents that the unnecessary frequency component is superimposed on the transmission wave.

Other Modifications

The present disclosure is not limited to the configurations of the above embodiment and the second embodiment. Further, the embodiments of the present disclosure may be changed variously to have a configuration other than the above configurations.

For example, in the above embodiments, as illustrated in FIGS. 11A and 11B, after the pulse compression is performed by the matched filter 213, the beamforming then separates the signal into the signal in each direction, but the beamforming may first separate the reception signal into the signal in each direction and then the pulse compression may be performed by the matched filter to the separated signal in each direction.

Further, although in the second embodiment the first transmission signal S11 and the second transmission signal S12 before the window is applied are the same signals as the third transmission signal S13 and the fourth transmission signal S14 before the window is applied, the first transmission signal S11 and the second transmission signal S12 before the window is applied may be different signals from the third transmission signal S13 and the fourth transmission signal S14 before the window is applied, as long as the unnecessary frequency component of the transmission wave can be suppressed.

Figure 21A:
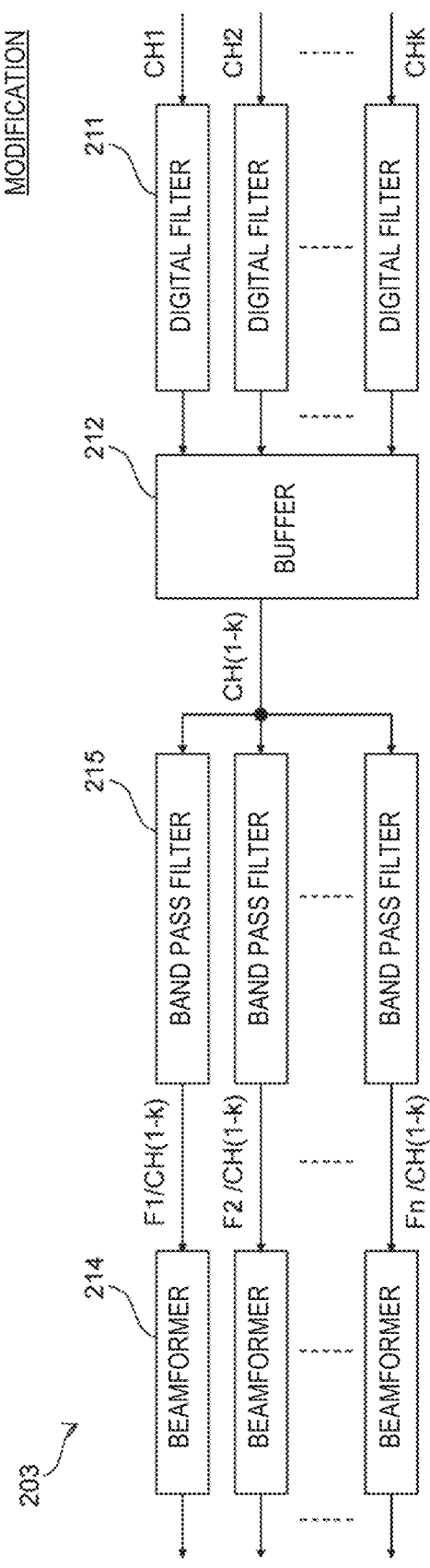
FIG. 21A is a functional block diagram illustrating one example of a configuration of a reception signal processor, according to the modification.
Figure 21B:
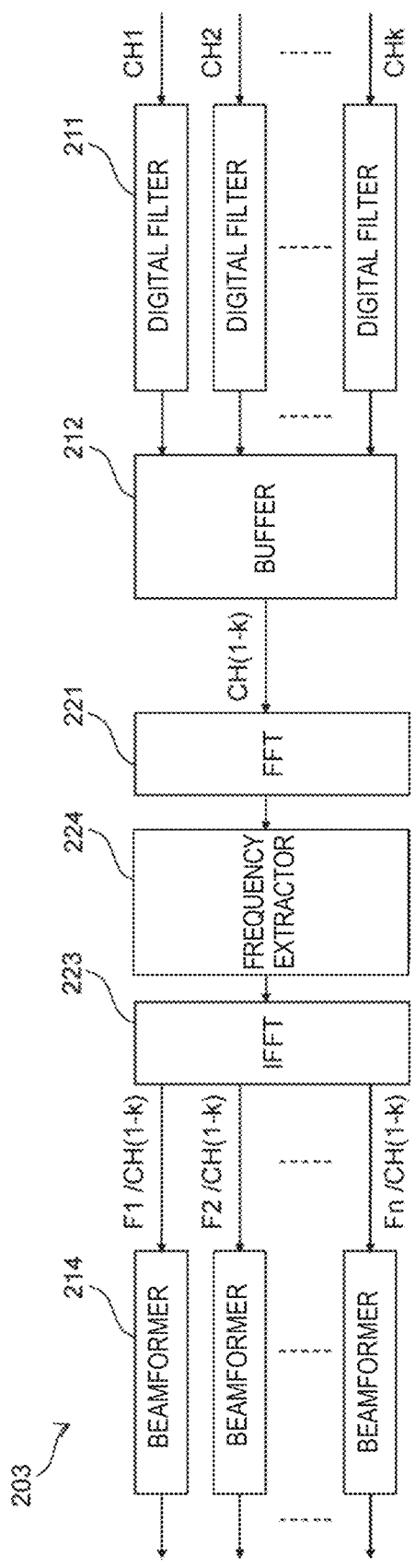
FIG. 21B is a functional block diagram illustrating another example of a configuration of the reception signal processor, according to the modification.

Further, although in the above embodiment the career signal of the first transmission signal S11 and the second transmission signal S12 is frequency-modulated, the frequency of the career signal may be constant. In this case, the configuration of the reception signal processor 203 may be changed as illustrated in FIGS. 21A and 21B. That is, in the configuration of FIG. 21A, the matched filter 213 of FIG. 11A may be changed into a band pass filter 215. Each band pass filter 215 may extract the frequency component of the corresponding equifrequency surface from the reception signal of each channel, and output it to the subsequent beamformer 214.

Further, in the configuration of FIG. 21B, the matched filter 222 of FIG. 11B may be changed into a frequency extractor 224. An FFT 211 may calculate a frequency spectrum from the reception signal of each channel. The frequency extractor 224 may extract the frequency component of the corresponding equifrequency surface from the calculated frequency spectrum of each channel. The extracted frequency component of each equifrequency surface may be converted into a signal of the time domain by an IFFT 223, and be outputted to the subsequent beamformer 214.

Thus, also when the frequency of the career signal of the first transmission signal S11 and the second transmission signal S12 is constant, it prevents that the ripple occurs in the envelope of the transmission waveform by setting each window as illustrated in FIG. 7 and supplying the first transmission signal S11 and the second transmission signal S12 to each wave transmitting element 10a of the wave transmitting array 10 using the configuration of FIG. 9. Therefore, the accuracy of the target object detection can be raised.

Note that, also in this modification, the configuration of the modification illustrated in FIG. 15 and the configuration of the second embodiment illustrated in FIGS. 16 to 20 may be applied. Therefore, similar effects to the modification and the second embodiment may be obtained.

Further, in the above-described second embodiment, the timing at which the first wave transmitting elements 11a used as the supply destinations of the first transmission signal S11 and the second transmission signal S12 are switched, and the timing at which the second wave transmitting elements 12a used as the supply destinations of the third transmission signal S13 and the fourth transmission signal S14 are switched are not limited to the timing illustrated in FIG. 17, but they may be other timings, as long as the unnecessary frequency component which occurs in the transmission wave can be suppressed.

Further, in the second embodiment, the configurations of the first wave transmitting array 11 and the second wave transmitting array 12 are not limited to the configuration of FIG. 16, but they may be other configurations, as long as the change in the frequency based on the Doppler effect may be caused in the transmission beam TB1.

For example, as illustrated in FIG. 22A, the first wave transmitting array 11 and the second wave transmitting array 12 may be constituted so that the second wave transmitting element 12*a* may be positioned in the side of the boundary between two adjacent first wave transmitting elements 11*a*. Also in this case, for the first wave transmitting element 11*a* and the second wave transmitting element 12*a*, the first transmission signal S11 and the second transmission signal S12, and the third transmission signal S13 and the fourth transmission signal S14 may be supplied to the corresponding wave transmitting elements of the first wave transmitting array 11 and the second wave transmitting array 12 at the timing similar to the case of FIG. 17. Therefore, the unnecessary frequency component which is generated on the transmission wave can be suppressed.

Further, the method of grouping the wave transmitting elements 10*a* is not limited to the method of FIG. 15, but it may be other methods, as long as the wave transmission source can be moved in one direction. For example, as illustrated in FIG. 22B, the plurality of wave transmitting elements 10*a* may be grouped into a plurality of groups, and the supply destinations of the transmission signal S1 may be switched from one group to another. Also by this configuration, since the wave transmission source can be moved in the moving direction D10, the change in the frequency based on the Doppler effect can be caused in the transmission beam TB1. Further, since the transmission wave is transmitted per group, the output of the transmission wave can be increased. The number of wave transmitting elements 10*a* grouped is not limited to two, but may be three or more.

Further, the number of wave transmitting elements is not limited to the numbers illustrated in the above embodiment and the second embodiment, but may be other numbers, as long as it is plural. Further, although in the above embodiment the wave transmitting array 10 and the wave receiving array 30 are disposed perpendicular to each other, the wave transmitting array 10 and the wave receiving array 30 may be disposed at an angle slightly offset from the perpendicular.

Further, in the above embodiment, as illustrated in FIG. 9, the first signal switch 21 is comprised of a single demultiplexer, but the first signal switch 21 may be comprised of a plurality of demultiplexers.

For example, when the first signal switch 21 is comprised of two demultiplexers, odd-numbered wave transmitting elements 10*a* may be connected to a plurality of output-side terminals of one of the demultiplexers, and even-numbered wave transmitting elements 10*a* may be connected to a plurality of output-side terminals of the other demultiplexer. In this case, the first transmission signal S11 may be inputted into the two demultiplexers, and the two demultiplexers may be controlled so that one demultiplexer supplies the first transmission signal S11 to the wave transmitting element 10*a* at the timing when odd-numbered wave transmitting elements 10*a* are driven, and the other demultiplexer supplies the first transmission signal S11 to the wave transmitting element 10*a* at the timing when even-numbered wave transmitting elements 10*a* are driven. The second signal switch 22, the third signal switch 23, and the fourth signal switch 24 may be similarly comprised of a plurality of demultiplexers.

Further, the sweeping method of the wave transmitting array is not limited to the methods illustrated in the above embodiment and the second embodiment, but it may be other sweeping methods. For example, in the unit pulse period, the wave transmitting array 10 may be swept only once by the first transmission signal S11, and may be swept only once by the second transmission signal S12.

Further, although FIG. 14 illustrates the configuration in a case where the target object detecting device 1 (sonar, radar) is disposed in the ship 2, the target object detecting device 1 (sonar, radar) may be installed in movable bodies other than the ship 2, or the target object detecting device 1 (sonar, radar) may be installed in structures other than the movable body, such as a buoy. For example, the target object detecting device 1 (sonar) may be installed in a fish pen in order to observe fish cultivated in the fish pens.

The embodiments of the present disclosure may be suitably changed within the scope of the appended claims.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A target object detecting device, comprising:
   a first transmission signal generator configured to generate a first transmission signal;
   a second transmission signal generator configured to generate a second transmission signal;
   a first wave transmitting array having a plurality of first wave transmitting elements configured to convert the first transmission signal and the second transmission signal into transmission waves;
   a first signal switch configured to supply the first transmission signal to one of the first wave transmitting elements in the first wave transmitting array;
   a second signal switch configured to supply the second transmission signal to one of the first wave transmitting elements in the first wave transmitting array; and
   a controller configured to perform a first control in which the first signal switch switches the first wave transmitting element to which the first transmission signal is supplied, from an element n to an element n+1, and the second signal switch switches the first wave transmitting element to which the second transmission signal is supplied, from an element m to an element m+1.

2. The target object detecting device of claim 1, wherein, in the first wave transmitting array, the element n+1 is adjacent to the element n, and the element m+1 is adjacent to the element m.

3. The target object detecting device of claim 2, wherein, after the first control, the controller performs a second control in which the first signal switch switches the first wave transmitting element to which the first transmission signal is supplied, from the element n+1 to an element n+2 adjacent to the element n+1, and the second signal switch switches the first wave transmitting element to which the second transmission signal is supplied, from the element m+1 to an element m+2 adjacent to the element m+1.

4. The target object detecting device of claim 1, wherein the first wave transmitting array is provided with P first wave transmitting elements, and when P is an even number, (P/2)−1 first wave transmitting elements are included between the element n and the element m, and when P is an odd number, (P−1)/2 or {(P−1)/2}−1 first wave transmitting elements are included between the element n and the element m.

5. The target object detecting device of claim 1, wherein the first wave transmitting array is provided with P first wave transmitting elements, from first wave transmitting element 1 to first wave transmitting element P, and when the element n+1 corresponds to the first wave transmitting element beyond the first wave transmitting element P, the first signal switch switches the first wave transmitting element to which the first transmission signal is supplied, from the first wave transmitting element P to the first wave transmitting element 1, and when the element m+1 corresponds to the first wave transmitting element beyond the first wave transmitting element P, the second signal switch switches the first wave transmitting element to which the second transmission signal is supplied, from the first wave transmitting element P to the first wave transmitting element 1.

6. The target object detecting device of claim 1, wherein the first transmission signal is a frequency-modulated signal, and the second transmission signal is a frequency-modulated signal.

7. The target object detecting device of claim 1, wherein the plurality of first wave transmitting elements are grouped into a plurality of groups, and in each of the groups the first wave transmitting elements are connected to each other;
wherein the first signal switch is configured to supply the first transmission signal to one of the groups in the first wave transmitting array,
wherein the second signal switch is configured to supply the second transmission signal to one of the groups in the first wave transmitting array, and
wherein, in the first control of the controller, the first signal switch switches the group to which the first transmission signal is supplied, from a group g to a group g+1, and the second signal switch switches the group to which the second transmission signal is supplied, from a group h to a group h+1.

8. The target object detecting device of claim 7, wherein the group g and the group g+1 share at least one of the first wave transmitting elements, and the group h and the group h+1 share at least one of the first wave transmitting elements.

9. The target object detecting device of claim 1, wherein a first part of the first transmission signal is supplied to the element n, and a second part of the first transmission signal different from the first part is supplied to the element n+1, and
wherein a first part of the second transmission signal is supplied to the element m, and a second part of the second transmission signal different from the first part of the second transmission signal is supplied to the element m+1.

10. The target object detecting device of claim 1, further comprising:
a third transmission signal generator configured to generate a third transmission signal;
a fourth transmission signal generator configured to generate a fourth transmission signal;
a second wave transmitting array having a plurality of second wave transmitting elements configured to convert the third transmission signal and the fourth transmission signal into transmission waves;
a third signal switch configured to supply the third transmission signal to one of the second wave transmitting elements in the second wave transmitting array; and
a fourth signal switch configured to supply the fourth transmission signal to one of the second wave transmitting elements in the second wave transmitting array,
wherein, after the first control, the controller further performs a third control in which the third signal switch switches the second wave transmitting element to which the third transmission signal is supplied, from an element n to an element n+1, and the fourth signal switch switches the second wave transmitting element to which the fourth transmission signal is supplied, from an element m to an element m+1.

11. The target object detecting device of claim 10, wherein, in the second wave transmitting array, the element n+1 is adjacent to the element n, and the element m+1 is adjacent to the element m, and
wherein the element n of the first wave transmitting array is adjacent to the element n of the second wave transmitting array, and the element m of the first wave transmitting array is adjacent to the element m of the second wave transmitting array.

12. The target object detecting device of claim 10, wherein the third transmission signal is a frequency-modulated signal, and the fourth transmission signal is a frequency-modulated signal.

13. The target object detecting device of claim 1, further comprising a wave receiving array including at least one wave receiving element configured to receive a reflection wave caused by reflection of the transmission wave on a target object, and convert the reflection wave into a reception signal.

14. The target object detecting device of claim 13, further comprising
a reception signal processor configured to process the reception signal, wherein
the reception signal processor extracts, based on a frequency component of the reception signal, an equifrequency reception signal based on the reflection wave from an equifrequency surface corresponding to the frequency.

15. The target object detecting device of claim 14, wherein the reception signal processor extracts a plurality of frequency components from the reception signal at mutually different frequencies to acquire the equifrequency reception signals of the equifrequency surfaces corresponding to the respective frequencies.

16. The target object detecting device of claim 14, wherein the reception signal processor calculates a frequency spectrum of the reception signal, and acquires the equifrequency reception signals of the equifrequency surfaces corresponding to the respective frequencies, based on the frequency spectrum.

17. The target object detecting device of claim 13, wherein the wave receiving array includes a plurality of wave receiving elements, and
wherein the reception signal processor performs beamforming based on the reception signal generated by each of the wave receiving elements, and calculates an incoming direction of the reflection wave from the target object based on the beamforming.

18. The target object detecting device of claim 13, wherein the wave receiving array includes a plurality of wave receiving elements,
wherein the wave receiving array differs from the first wave transmitting array, and
wherein a reception beam formed based on the reception signal generated by each of the wave receiving elements intersects with a transmission beam formed by the first wave transmitting array.

19. The target object detecting device of claim 1, wherein the first signal switch and the second signal switch are controlled so that both the first signal switch and the second signal switch sweep the plurality of first wave transmitting elements.

20. A target object detecting method performed by a target object detecting device, the method comprising:
generating a first transmission signal;
generating a second transmission signal;
converting, by a first wave transmitting array having a plurality of first wave transmitting elements, the first transmission signal and the second transmission signal into transmission waves;
supplying, by a first signal switch, the first transmission signal to one of the first wave transmitting elements in the first wave transmitting array;
supplying, by a second signal switch, the second transmission signal to one of the first wave transmitting elements in the first wave transmitting array; and
performing a first control in which the first signal switch switches the first wave transmitting element to which the first transmission signal is supplied, from an element n to an element n+1, and the second signal switch switches the first wave transmitting element to which the second transmission signal is supplied, from an element m to an element m+1.

* * * * *